(12) United States Patent
Futamura et al.

(10) Patent No.: US 9,513,154 B2
(45) Date of Patent: Dec. 6, 2016

(54) CONNECTOR MOUNTING STRUCTURE, MOUNTING-RESULT INSPECTION TOOL, AND MOUNTING-RESULT INSPECTION METHOD

(71) Applicant: TOYOTA JIDOSHA KABUSHIKI KAISHA, Toyota-shi (JP)

(72) Inventors: Tomonori Futamura, Kasugai (JP); Masayoshi Nakai, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 220 days.

(21) Appl. No.: 14/325,506

(22) Filed: Jul. 8, 2014

(65) Prior Publication Data
US 2015/0013428 A1 Jan. 15, 2015

(30) Foreign Application Priority Data
Jul. 11, 2013 (JP) ................................. 2013-145207

(51) Int. Cl.
| | |
|---|---|
| *F01M 11/12* | (2006.01) |
| *H01R 13/74* | (2006.01) |
| *G01F 25/00* | (2006.01) |
| *G01F 23/00* | (2006.01) |
| *G01F 23/24* | (2006.01) |
| *F02B 77/00* | (2006.01) |

(52) U.S. Cl.
CPC .......... *G01F 25/0061* (2013.01); *F01M 11/12* (2013.01); *G01F 23/00* (2013.01); *G01F 23/242* (2013.01); *H01R 13/745* (2013.01); *F02B 77/005* (2013.01)

(58) Field of Classification Search
CPC .................................................... G01F 25/0061
See application file for complete search history.

(56) References Cited

U.S. PATENT DOCUMENTS

| | | | |
|---|---|---|---|
| 5,681,186 A | 10/1997 | Wright | |
| 6,237,411 B1 * | 5/2001 | Schimmel | G01F 23/242 338/260 |
| 6,316,951 B1 * | 11/2001 | Chiyoda | G01R 31/045 324/72.5 |
| 2013/0203284 A1 * | 8/2013 | Perotto | B29C 45/14639 439/530 |

FOREIGN PATENT DOCUMENTS

| | | | | |
|---|---|---|---|---|
| JP | 3-99821 U | 10/1991 | | |
| JP | 9-245905 A | 9/1997 | | |
| JP | 2003123930 A | * | 4/2003 | ............ H01R 13/52 |
| JP | 2012-246888 | 12/2012 | | |

* cited by examiner

*Primary Examiner* — Daniel J Colilla
*Assistant Examiner* — Ruben Parco, Jr.
(74) *Attorney, Agent, or Firm* — Oblon, McClelland, Maier & Neustadt, L.L.P.

(57) ABSTRACT

A connector is used to bring a harness from a level sensor that is arranged in the oil pan and detects a level of oil in the oil pan, out of the oil pan. The connector includes a contact that is electrically connected to the level sensor, and a housing that retains the contact. The housing includes a housing portion that is housed in the connector mounting hole, and a clip attaching groove and a flange portion that are arranged sandwiching the housing portion. A clip and the flange portion sandwich the oil pan, such that the connector is attached to the oil pan, by the housing portion being housed in the connector mounting hole, and the clip being attached to the clip attaching groove.

4 Claims, 27 Drawing Sheets

FIG. 5
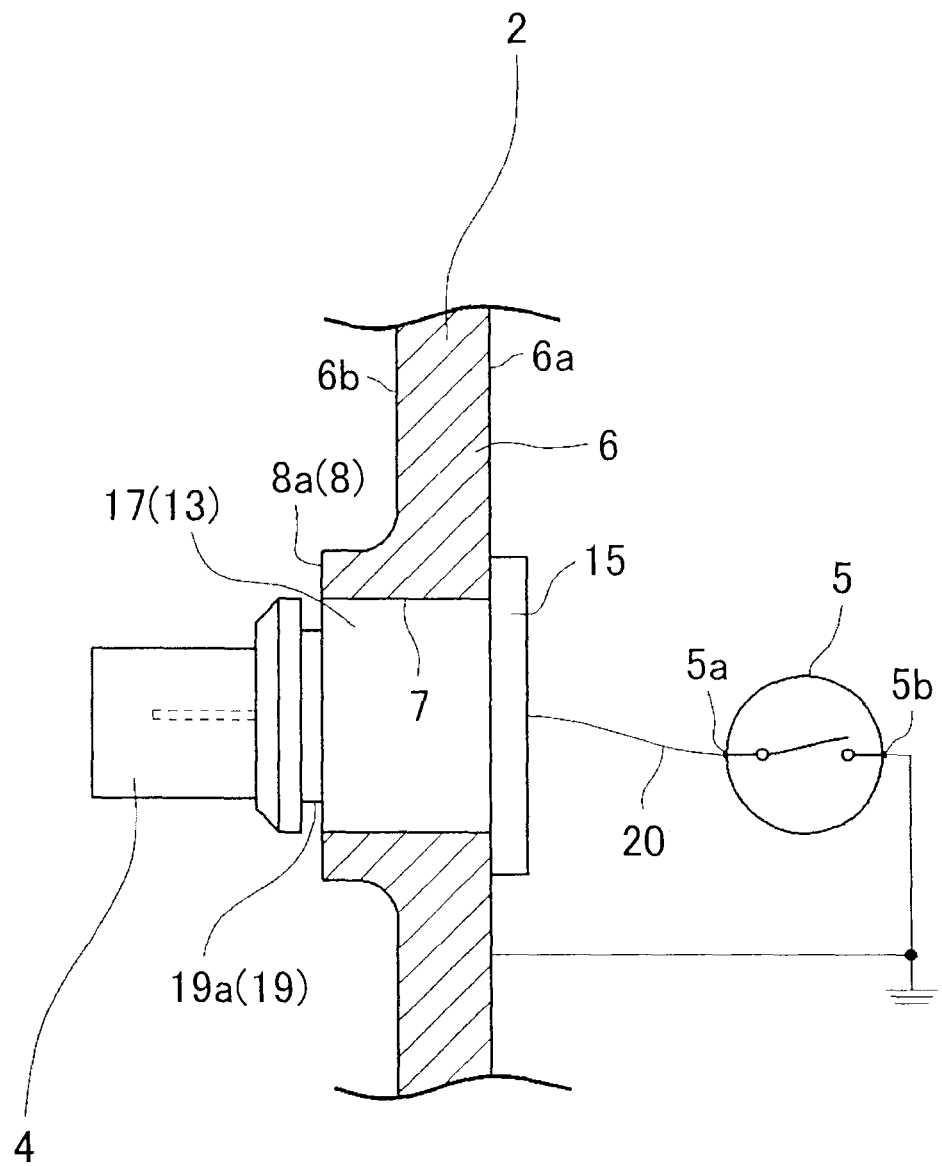
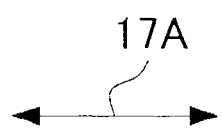

FIG. 6
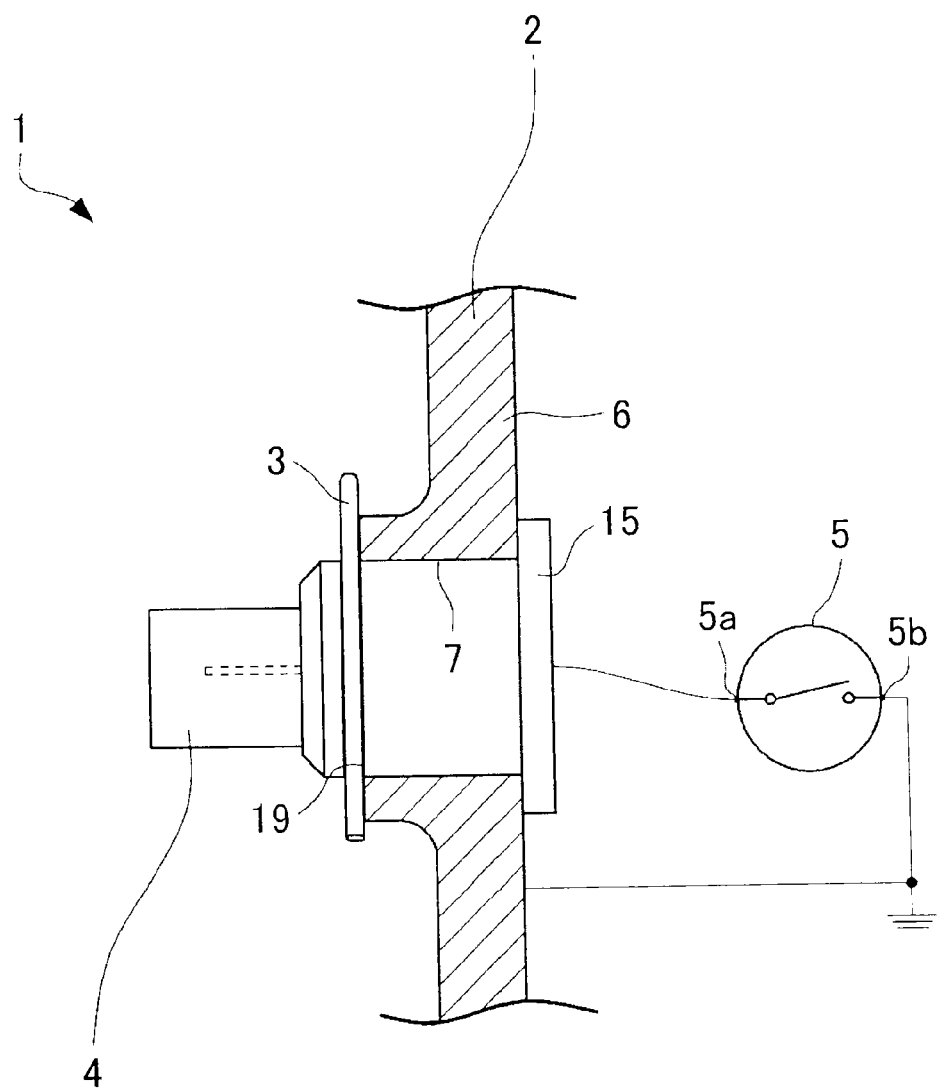
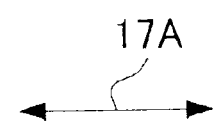

F I G . 16
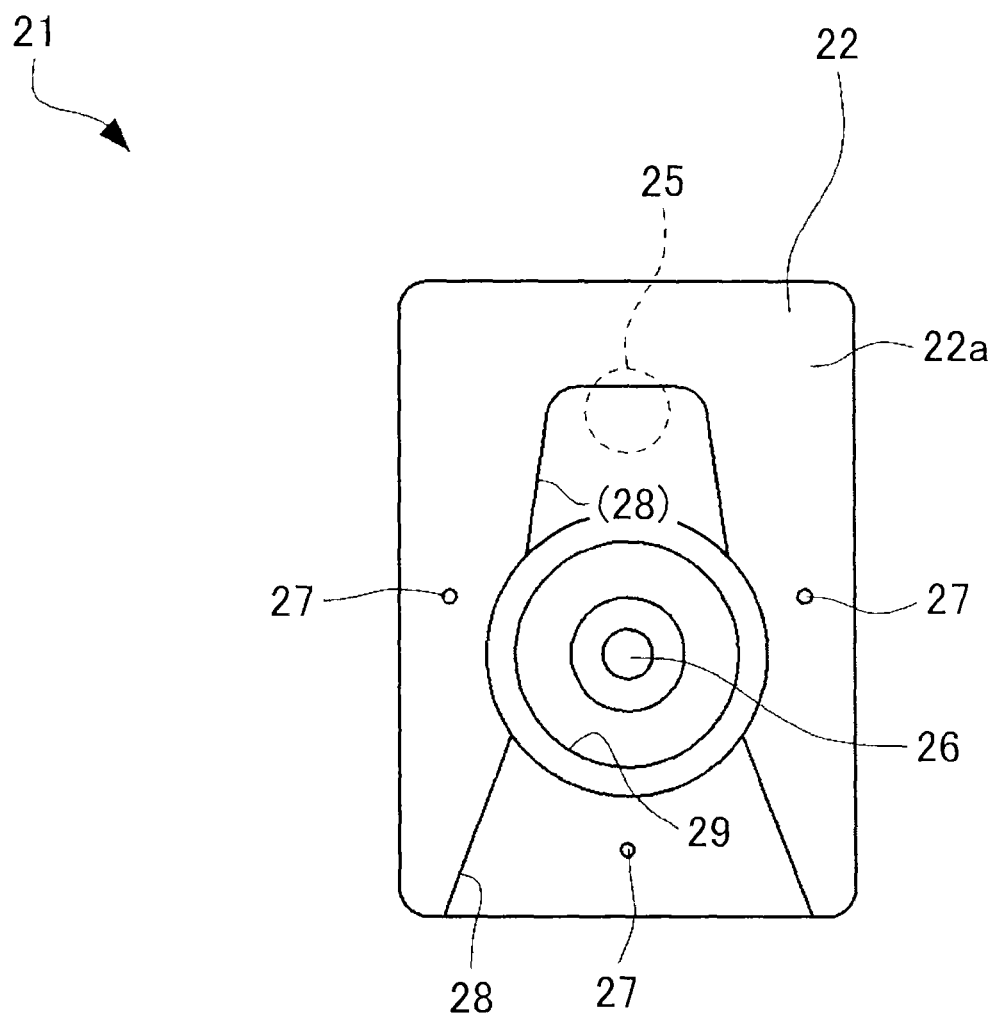

F I G . 23
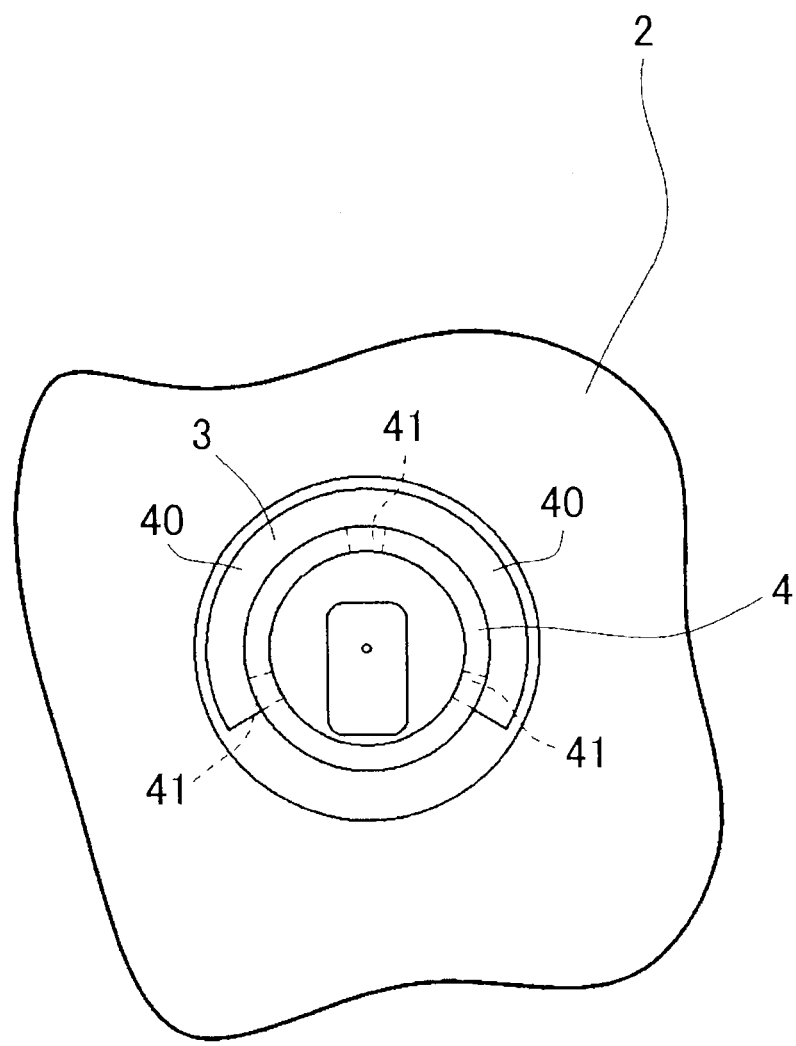

CONNECTOR MOUNTING STRUCTURE, MOUNTING-RESULT INSPECTION TOOL, AND MOUNTING-RESULT INSPECTION METHOD

INCORPORATION BY REFERENCE

The disclosure of Japanese Patent Application No. 2013-145207 filed on Jul. 11, 2013 including the specification, drawings and abstract is incorporated herein by reference in its entirety.

BACKGROUND OF THE INVENTION

1. Field of the Invention

The invention relates to a connector mounting structure, a mounting-result inspection tool, and a mounting-result inspection method.

2. Description of Related Art

One such type of technology is described in Japanese Utility Model Application Publication No. 3-99821 (JP 3-99821 U), which describes a detection sensor for detecting a constant decrease in oil in an oil pan of an engine. This detection sensor is mounted to the oil pan by a bolt in a predetermined position.

However, with the structure described in (JP 3-99821 U), a connector for bringing wiring from the detection sensor out of the oil pan is mounted to the oil pan by a bolt, so the mounting cost is high.

SUMMARY OF THE INVENTION

The invention thus provides technology for inexpensively mounting a connector for bringing wiring from a detection sensor out of an oil pan, to the oil pan.

One aspect of the invention relates to a connector mounting structure that includes an oil pan that has a connector mounting hole, an elastic body that extends in a U-shape, and a connector. The connector brings wiring from a level detection sensor that is arranged in the oil pan and detects a level of oil in the oil pan out of the oil pan. The connector includes a contact that is electrically connected to the level detection sensor, and a housing that retains the contact. The housing includes a housing portion that is housed in the connector mounting hole, and an elastic body attaching groove and a catching portion that are arranged sandwiching the housing portion. The elastic body and the catching portion sandwich the oil pan, such that the connector is attached to the oil pan, by the housing portion being housed in the connector mounting hole, and the elastic body being attached to the elastic body attaching groove.

According to this structure, the connector is able to be inexpensively mounted to the oil pan.

The elastic body may have a pair of arms and three pawl portions, and extend in an E-shape.

Another aspect of the invention relates to a mounting-result inspection tool that inspects whether an elastic body is properly attached to an elastic body attaching groove. This mounting-result inspection tool includes a connector mounting structure, an inspection tool main body, and a probe. The connector mounting structure includes an oil pan having a connector mounting hole, an elastic body that extends in a U-shape, and a connector. The connector brings wiring from a level detection sensor that is arranged in the oil pan and detects a level of oil in the oil pan out of the oil pan. The connector includes a contact that is electrically connected to the level detection sensor, and a housing that retains the contact. The housing includes a housing portion that is housed in the connector mounting hole, and an elastic body attaching groove and a catching portion that are arranged sandwiching the housing portion. The elastic body and the catching portion sandwich the oil pan, such that the connector is attached to the oil pan, by the housing portion being housed in the connector mounting hole, and the elastic body being attached to the elastic body attaching groove. The inspection tool main body has a recessed portion with a shape complementary to that of the elastic body that is properly attached to the elastic body attaching groove. The probe contacts the contact of the connector, or the oil pan, when the elastic body that is properly attached to the elastic body attaching groove is housed in the recessed portion of the inspection tool main body, and does not contact the contact of the connector, or the oil pan, when the elastic body is improperly attached to the elastic body attaching groove.

This structure makes it possible to inspect whether the elastic body is properly attached to the elastic body attaching groove, by detecting that the probe is contacting the contact of the connector, or the oil pan.

Still another aspect of the invention relates to a mounting-result inspection tool that inspects whether an elastic body is properly attached to an elastic body attaching groove. This mounting-result inspection tool includes a connector mounting structure, an inspection tool main body, a first probe, a second probe, and a conduction tester. The connector mounting structure includes an oil pan having a connector mounting hole, an elastic body that extends in a U-shape, and a connector. The connector brings wiring from a level detection sensor that is arranged in the oil pan and detects a level of oil in the oil pan out of the oil pan. The connector includes a contact that is electrically connected to the level detection sensor, and a housing that retains the contact. The housing includes a housing portion that is housed in the connector mounting hole, and an elastic body attaching groove and a catching portion that are arranged sandwiching the housing portion. The elastic body and the catching portion sandwich the oil pan, such that the connector is attached to the oil pan, by the housing portion being housed in the connector mounting hole, and the elastic body being attached to the elastic body attaching groove. The inspection tool main body has a recessed portion with a shape complementary to that of the elastic body that is properly attached to the elastic body attaching groove. The first probe contacts the contact of the connector when the elastic body that is properly attached to the elastic body attaching groove is housed in the recessed portion of the inspection tool main body, and does not contact the contact of the connector when the elastic body is improperly attached to the elastic body attaching groove. The second probe contacts the oil pan when the elastic body that is properly attached to the elastic body attaching groove is housed in the recessed portion of the inspection tool main body, and does not contact the oil pan when the elastic body is improperly attached to the elastic body attaching groove. The conduction tester inspects conduction between the first probe and the second probe.

This structure makes it possible to easily detect, using the conduction tester, that the first probe is contacting the contact of the connector and that the second probe is contacting the oil pan, when the contact of the connector is electrically connected to the oil pan (i.e., when there is conduction therebetween). As a result, it is possible to easily inspect whether the elastic body is properly attached to the elastic body attaching groove.

Yet another aspect of the invention relates to a mounting-result inspection tool that inspects whether an elastic body is properly attached to an elastic body attaching groove. This mounting-result inspection tool includes a connector mounting structure, an inspection tool main body, a distance measuring sensor, and a conduction tester. The connector mounting structure includes an oil pan having a connector mounting hole, an elastic body that extends in a U-shape, and a connector. The connector brings wiring from a level detection sensor that is arranged in the oil pan and detects a level of oil in the oil pan out of the oil pan. The connector includes a contact that is electrically connected to the level detection sensor, and a housing that retains the contact. The housing includes a housing portion that is housed in the connector mounting hole, and an elastic body attaching groove and a catching portion that are arranged sandwiching the housing portion. The elastic body and the catching portion sandwich the oil pan, such that the connector is attached to the oil pan, by the housing portion being housed in the connector mounting hole, and the elastic body being attached to the elastic body attaching groove. The inspection tool main body has a recessed portion with a shape complementary to that of the elastic body that is properly attached to the elastic body attaching groove. The distance measuring sensor measures a distance between the inspection tool main body and the oil pan. The conduction tester performs an inspection by measuring the distance between the inspection tool main body and the oil pan.

This structure makes it possible to inspect whether the elastic body is properly attached to the elastic body attaching groove, by measuring the distance between the inspection tool main body and the oil pan using the distance measuring sensor.

The mounting-result inspection tool described above may also include a housing detector that detects that the elastic body is housed in the recessed portion of the inspection tool main body.

This structure makes it possible to detect whether the elastic body is present.

The elastic body may be made of metal that is magnetic material, and the oil pan may be made of metal that is nonmagnetic material.

Another aspect of the invention relates to a mounting-result inspection method for inspecting whether an elastic body is properly attached to an elastic body attaching groove using a mounting-result inspection tool. The mounting-result inspection tool includes an inspection tool main body and a probe. The connector mounting structure includes an oil pan having a connector mounting hole, the elastic body that extends in a U-shape, and a connector. The connector brings wiring from a level detection sensor that is arranged in the oil pan and detects a level of oil in the oil pan out of the oil pan. The connector includes a contact that is electrically connected to the level detection sensor, and a housing that retains the contact. The housing includes a housing portion that is housed in the connector mounting hole, and the elastic body attaching groove and a catching portion that are arranged sandwiching the housing portion. The elastic body and the catching portion sandwich the oil pan, such that the connector is attached to the oil pan, by the housing portion being housed in the connector mounting hole, and the elastic body being attached to the elastic body attaching groove. The inspection tool main body has a recessed portion with a shape complementary to that of the elastic body that is properly attached to the elastic body attaching groove. The probe contacts the contact of the connector, or the oil pan, when the elastic body that is properly attached to the elastic body attaching groove is housed in the recessed portion of the inspection tool main body, and does not contact the contact of the connector, or the oil pan, when the elastic body is improperly attached to the elastic body attaching groove. The mounting-result inspection method includes attempting to house the elastic body in the recessed portion of the inspection tool main body, and detecting that the probe is contacting the contact of the connector, or the oil pan.

This method makes it possible to inspect whether the elastic body is properly attached to the elastic body attaching groove.

Still another aspect of the invention relates to a mounting-result inspection method for inspecting whether an elastic body is properly attached to an elastic body attaching groove using a mounting-result inspection tool. The mounting-result inspection tool includes an inspection tool main body, a first probe, and a second probe. The connector mounting structure includes an oil pan having a connector mounting hole, the elastic body nut extends in a U-shape, and a connector. The connector brings wiring from a level detection sensor that is arranged in the oil pan and detects a level of oil in the oil pan out of the oil pan. The connector includes a contact that is electrically connected to the level detection sensor, and a housing that retains the contact. The housing includes a housing portion that is housed in the connector mounting hole, and the elastic body attaching groove and a catching portion that are arranged sandwiching the housing portion. The elastic body and the catching portion sandwich the oil pan, such that the connector is attached to the oil pan, by the housing portion being housed in the connector mounting hole, and the elastic body being attached to the elastic body attaching groove. The inspection tool main body has a recessed portion with a shape complementary to that of the elastic body that is properly attached to the elastic body attaching groove. The first probe contacts the contact of the connector when the elastic body that is properly attached to the elastic body attaching groove is housed in the recessed portion of the inspection tool main body, and does not contact the contact of the connector when the elastic body is improperly attached to the elastic body attaching groove. The second probe contacts the oil pan when the elastic body that is properly attached to the elastic body attaching groove is housed in the recessed portion of the inspection tool main body, and does not contact the oil pan when the elastic body is improperly attached to the elastic body attaching groove. The mounting-result inspection method includes attempting to house the elastic body in the recessed portion of the inspection tool main body, and inspecting conduction between the first probe and the second probe.

According to this method, it is possible to easily detect that the first probe is contacting the contact of the connector, and that the second probe is contacting the oil pan, when the contact of the connector is electrically connected to the oil pan (i.e., when there is conduction therebetween). As a result, it is easy to inspect whether the elastic body is properly attached to the elastic body attaching groove.

Yet another aspect of the invention relates to a mounting-result inspection method for inspecting whether an elastic body is properly attached to an elastic body attaching groove using a mounting-result inspection tool. The mounting-result inspection tool includes an inspection tool main body, a first probe, and a second probe. The connector mounting structure includes an oil pan having a connector mounting hole, the elastic body that extends in a U-shape, and a connector bringing wiring from a level detection sensor that is arranged in the oil pan and detects a level of oil in the oil pan out of the oil pan, and that includes a contact that is electrically connected to the level detection sensor, and a housing that retains the contact. The housing includes a housing portion that is housed in the connector mounting hole, and the elastic body attaching groove and a catching portion that are arranged sandwiching the housing portion. The elastic body and the catching portion sandwich the oil pan, such that the connector is attached to the oil pan, by the housing portion being housed in the connector mounting hole, and the elastic body being attached to the elastic body attaching groove. The inspection tool main body has a recessed portion with a shape complementary to that of the elastic body that is properly attached to the elastic body attaching groove. The first probe contacts the contact of the connector when the elastic body that is properly attached to the elastic body attaching groove is housed in the recessed portion of the inspection tool main body, and does not contact the contact of the connector when the elastic body is improperly attached to the elastic body attaching groove. The second probe contacts the oil pan when the elastic body that is properly attached to the elastic body attaching groove is housed in the recessed portion of the inspection tool main body, and does not contact the oil pan when the elastic body is improperly attached to the elastic body attaching groove. The mounting-result inspection method includes electrically connecting the contact of the connector to the oil pan by short-circuiting the level detection sensor, attempting to house the elastic body in the recessed portion of the inspection tool main body, and inspecting conduction between the first probe and the second probe.

According to this method, it is possible to easily detect that the first probe is contacting the contact of the connector, and that the second probe is contacting the oil pan, so it is easy to inspect whether the elastic body is properly attached to the elastic body attaching groove.

The mounting-result inspection method described above may also include detecting that the elastic body is housed in the recessed portion of the inspection tool main body.

This structure makes it possible to detect whether the elastic body is present.

The elastic body may be made of metal that is magnetic material, and the oil pan may be made of metal that is nonmagnetic material.

The mounting-result inspection tool may be rotated such that an orientation of the recessed portion of the inspection tool main body matches an orientation of the elastic body, when attempting to house the elastic body in the recessed portion of the inspection tool main body.

This aspect of the invention makes it possible to inexpensively mount a connector for bringing wiring from a detection sensor out of an oil pan, to the oil pan.

SUMMARY OF THE INVENTION

Brief Description of the Drawings

Features, advantages, and technical and industrial significance of exemplary embodiments of the invention will be described below with reference to the accompanying drawings, in which like numerals denote like elements, and wherein:

FIG. 5 is a side sectional view of the connector inserted into the connector mounting hole of the oil pan according to the first example embodiment;

FIG. 6 is a side sectional view of the connector mounted to the oil pan according to the first example embodiment;

FIG. 16 is a front view of the mounting-result inspection tool according to the first example embodiment;

FIG. 23 is a front view of a modified example of the clip, according to a second example embodiment of the invention;

DETAILED DESCRIPTION OF EMBODIMENTS

First Example Embodiment

Hereinafter, a connector mounting structure 1 will be described with reference to FIGS. 1 to 6. As shown in FIG. 6, the connector mounting structure 1 includes an oil pan 2, a clip 3 (i.e., an elastic body), and a connector 4.

Figure 2:
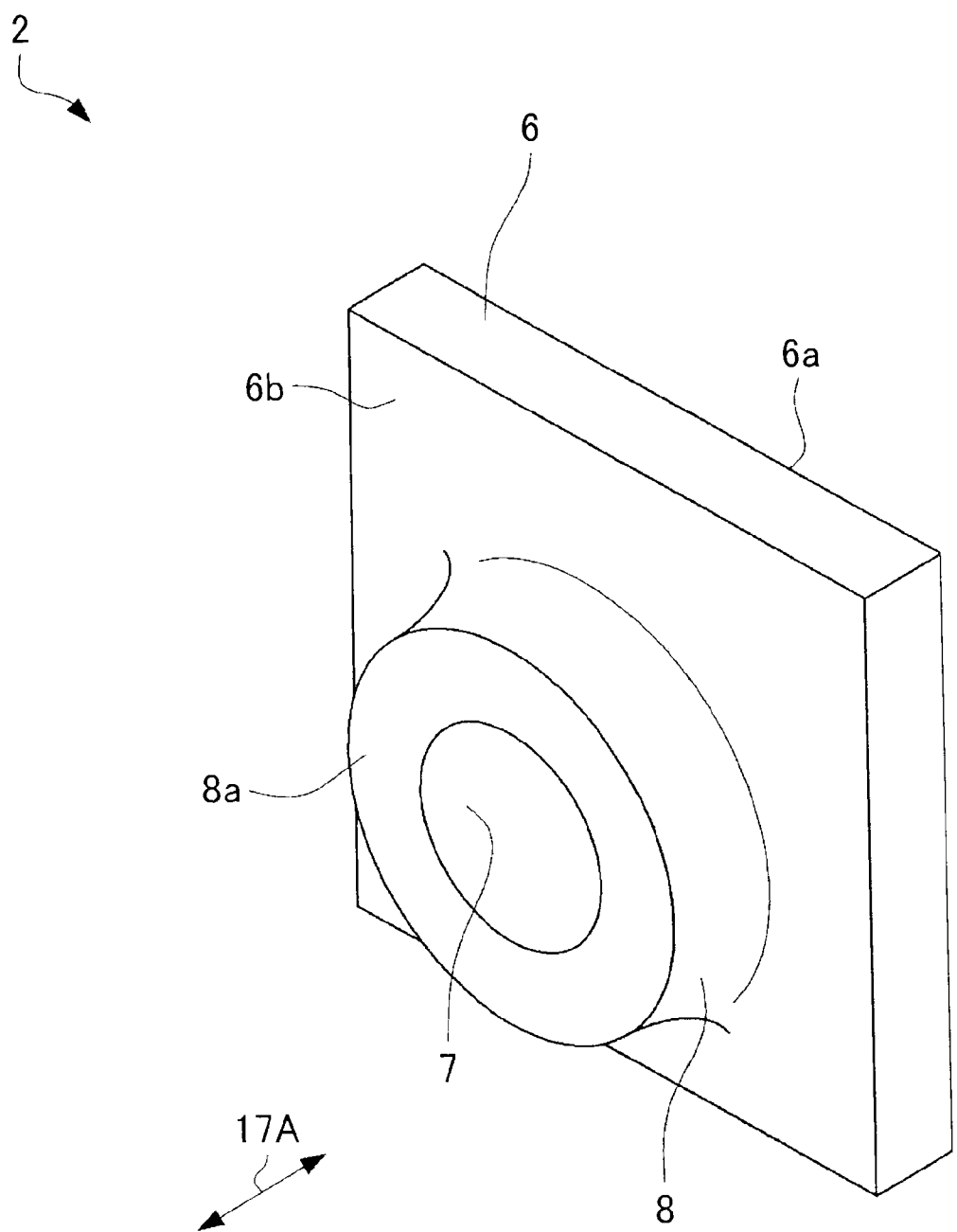
FIG. 2 is a perspective view of an oil pan according to the first example embodiment.

The oil pan 2 is a container that is arranged on a lower portion of an engine and collects engine oil. A level sensor 5 (i.e., a level detection sensor) for detecting the level of engine oil (oil) in the oil pan 2 is arranged in the oil pan 2. The level sensor 5 has a first terminal 5a and a second terminal 5b. The level sensor 5 short-circuits the first terminal 5a and the second terminal 5b when the engine oil level is equal to or higher than a predetermined height, and electrically disconnects the first terminal 5a and the second terminal 5b when the engine oil level is lower than the predetermined height. As shown in FIG. 2, the oil pan 2 is formed by an aluminum plate 6 that is nonmagnetic material of a predetermined thickness. The aluminum plate 6 has an inner wall surface 6a that is the inside of the oil pan 2, and an outer wall surface 6b that is the outside of the oil pan 2. A cylindrical connector mounting hole 7 is formed in the aluminum plate 6. A raised portion 8 is formed on the outer wall surface 6b of the aluminum plate 6. The raised portion 8 is raised in an annular shape along a peripheral edge of the connector mounting hole 7. The raised portion 8 rises toward the outside of the oil pan 2. The raised portion 8 has a seating surface 8a that corresponds to a tip end surface in the raised direction of the raised portion 8. As shown in FIG. 5, the oil pan 2 is grounded. The second terminal 5b of the level sensor 5 is also similarly grounded. Therefore, the second terminal 5b of the level sensor 5 is electrically connected to the oil pan 2.

Figure 3:
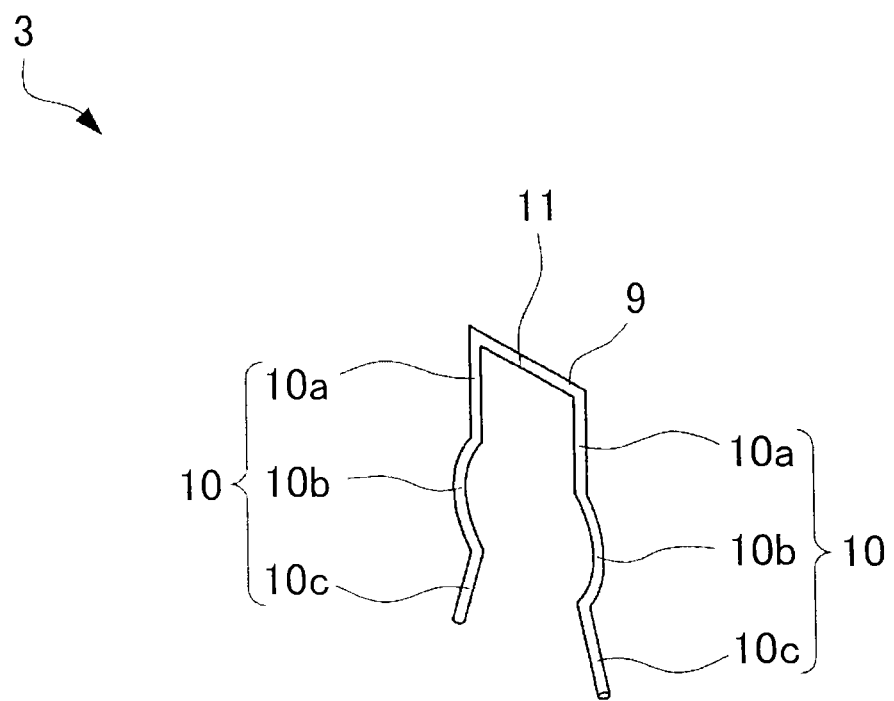
FIG. 3 is a perspective view of a clip according to the first example embodiment.

The clip 3 is formed by an iron wire 9 made of magnetic material such as silicon steel, for example, bent is a general U-shape, as shown in FIG. 3. The clip 3 has a pair of opposing portions 10, and a connecting portion 11. The pair of opposing portions 10 oppose each other. Each of the opposing portions 10 has a straight portion 10a, an arced portion 10b, and a guide portion 10c. The straight portion 10a, the arced portion 10b, and the guide portion 10c are continuous in this order. The straight portion 10a is a portion that extends in a straight line. The arced portion 10b is a portion that extends in an arc-shape. The guide portion 10c is a portion that extends away from the other opposing portion 10. The connecting portion 11 is a portion that connects the straight portions 10a of the pair of opposing portions 10 together.

Figure 1:
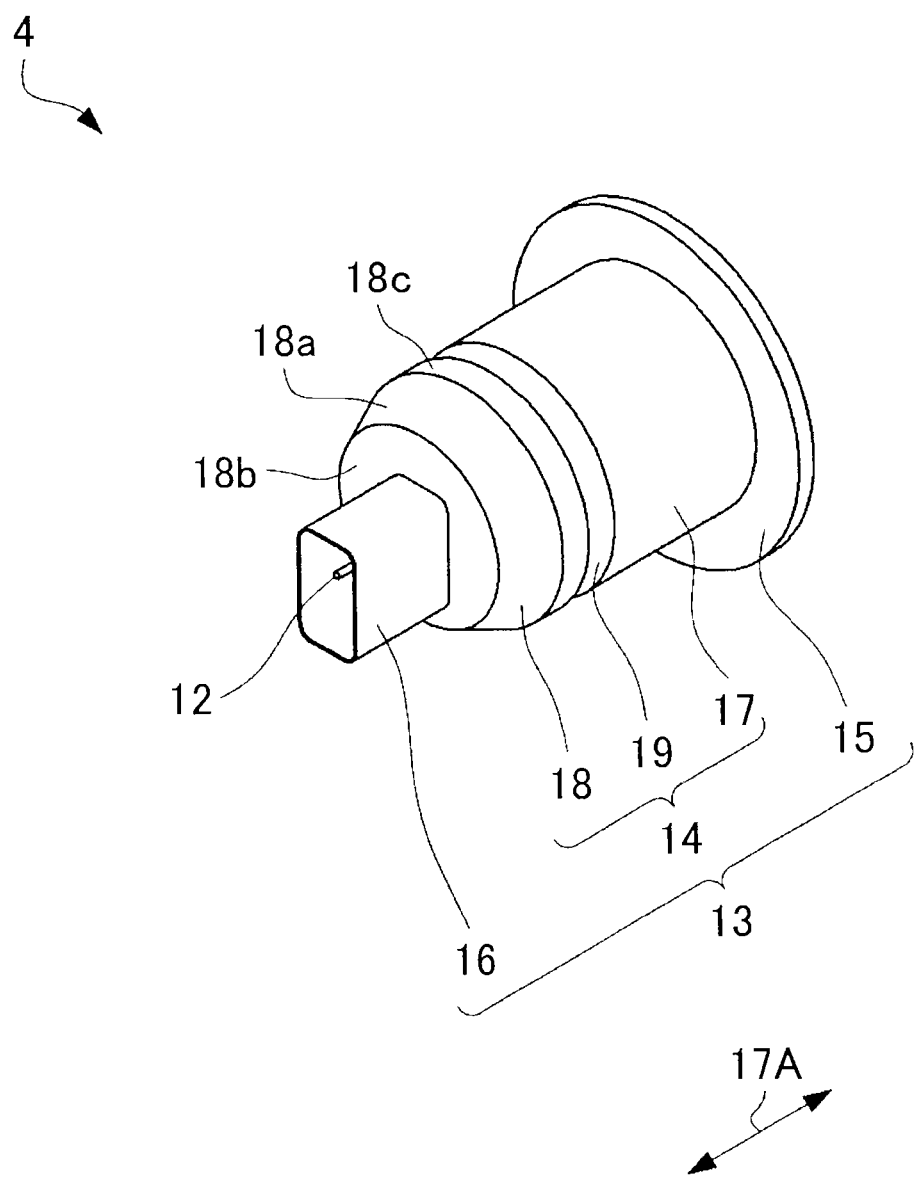
FIG. 1 is a perspective view of a connector according to a first example embodiment of the invention.

The connector 4 has a contact 12, and a housing 13 that retains the contact 12, as shown in FIG. 1. The housing 13 includes a generally circular cylindrical housing main body 14, a flange portion 15 (a catching portion), and a contact cover 16. The housing main body 14 has a housing portion 17, an insertion guiding portion 18, and a clip attaching groove 19 (an elastic body attaching groove). The housing portion 17 is a portion that is housed in the connector mounting hole 7 in FIG. 2, and is formed in a circular cylindrical shape. The axial direction of the housing portion 17 is defined as "axial direction 17A". The insertion guiding portion 18 has an inclined outer peripheral surface 18a as an outer peripheral surface that is inclined so as to taper, a tip end surface 18b, and a straight outer peripheral surface 18c as a straight outer peripheral surface. The clip attaching groove 19 is an annular groove arranged between the housing portion 17 and the insertion guiding portion 18. The clip attaching groove 19 has a groove bottom surface 19a, as shown in FIG. 5. The flange portion 15 is arranged on a tip portion in the axial direction 17A of the housing portion 17 of the housing main body 14. The contact cover 16 is a cover that protrudes in an angular tube-shape from the tip end surface 18b of the insertion guiding portion 18, and protects the contact 12. The contact 12 extends in the axial direction 17A inside the contact cover 16. The contact 12 is slightly exposed from the flange portion 15. Also, the contact 12 of the connector 4 is connected to the first terminal 5a of the level sensor 5 via a harness 20, as shown in FIG. 5. Therefore, when the level sensor 5 is short-circuited, the contact 12 of the connector 4 is electrically connected to the oil pan 2.

Figure 4:
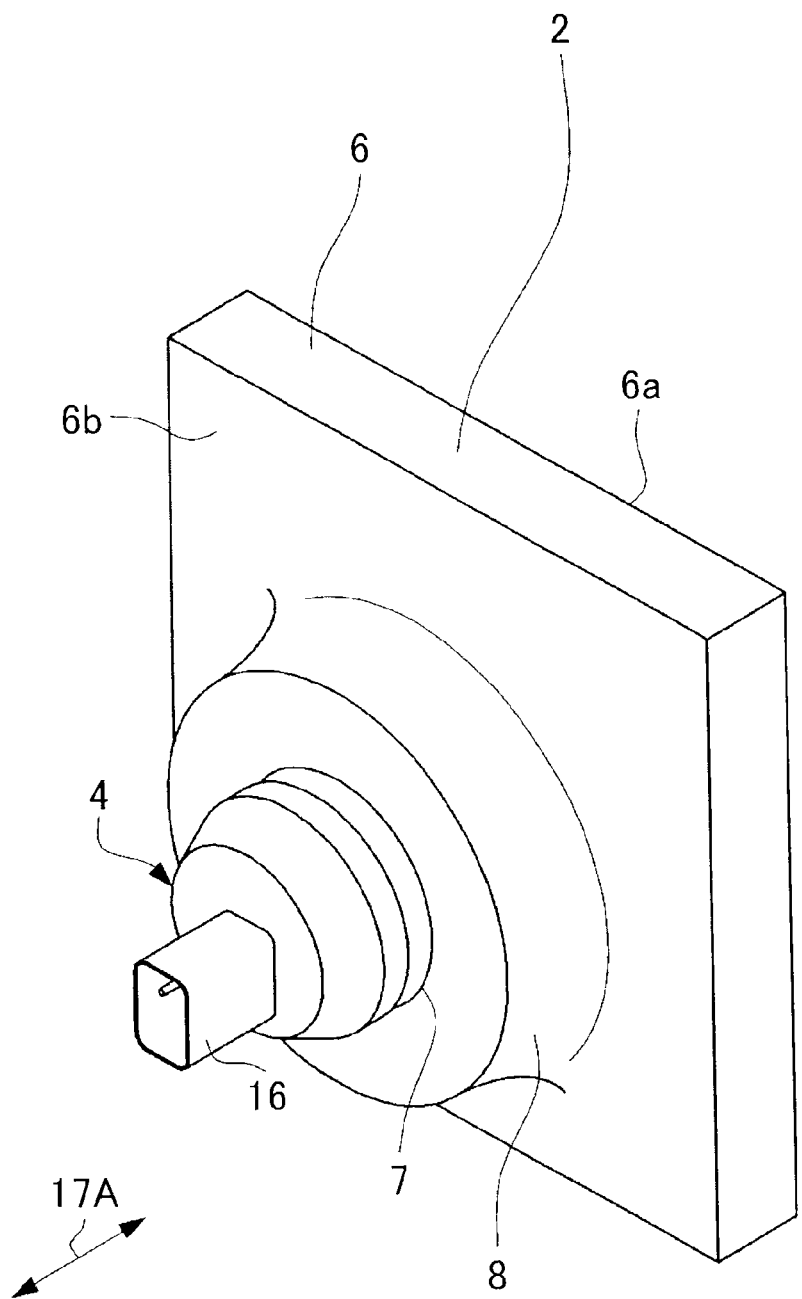
FIG. 4 is a perspective view of the connector inserted into a connector mounting hole of the oil pan according to the first example embodiment.

To assemble the connector mounting structure 1, first, the connector 4 is inserted, contact cover 16 end first, into the connector mounting hole 7 of the oil pan 2 from the inner wall surface 6a side, as shown in FIG. 4. When this is done, the housing portion 17 of the housing 13 of the connector 4 is housed in the connector mounting hole 7 of the oil pan 2, and the flange portion 15 catches on the inner wall surface 6a of the aluminum plate 6, thereby preventing the connector 4 from being inserted any further, as shown in FIG. 5. In this state, the clip attaching groove 19 is positioned contacting the seating surface 8a of the raised portion 8.

Next, the clip 3 is attached to the clip attaching groove 19, as shown in FIG. 6. More specifically, the arced portions 10b of the pair of opposing portions 10 of the clip 3 that is formed in a general U-shape shown in FIG. 3 attach the clip 3 to the connector 4, sandwiching the groove bottom surface 19a of the clip attaching groove 19 of the connector 4 shown in FIG. 5. When the clip 3 is attached to the clip attaching groove 19 of the connector 4, the clip 3 and the flange portion 15 sandwich the aluminum plate 6 of the oil pan 2, such that the connector 4 is attached to the oil pan 2, as shown in FIG. 6. The spring restoring force of the clip 3 is set relatively low so that the clip 3 can be pushed into the clip attaching groove 19 with one finger when attaching the clip 3 to the connector 4.

As described above, the connector mounting structure 1 has the characteristics described below.

(1) The connector mounting structure 1 includes the oil pan 2 having the connector mounting hole 7, the clip 3 (an elastic body) that extends in a general U-shape, and the connector 4. The connector 4 is arranged inside the oil pan 2, and is used to bring the harness 20 (wiring) from the level sensor 5 (a level detection sensor) that detects the oil level in the oil pan 2, out of the oil pan 2. The connector 4 includes the contact 12 that is electrically connected to the level sensor 5, and the housing 13 that retains the contact 12. The housing 13 has the housing portion 17 that is housed in the connector mounting hole 7, and the clip attaching groove 19 (an elastic body attaching groove) and the flange portion 15 (a catching portion) that are arranged sandwiching the housing portion 17. The clip 3 and the flange portion 15 sandwich the oil pan 2, such that the connector 4 is attached to the oil pan 2, by the housing portion 17 being housed in the connector mounting hole 7 and the clip 3 being attached to the clip attaching groove 19. The structure described above enables the connector 4 for bringing the harness 20 from the level sensor 5 out of the oil pan 2, to be inexpensively mounted to the oil pan 2.

Figure 7:
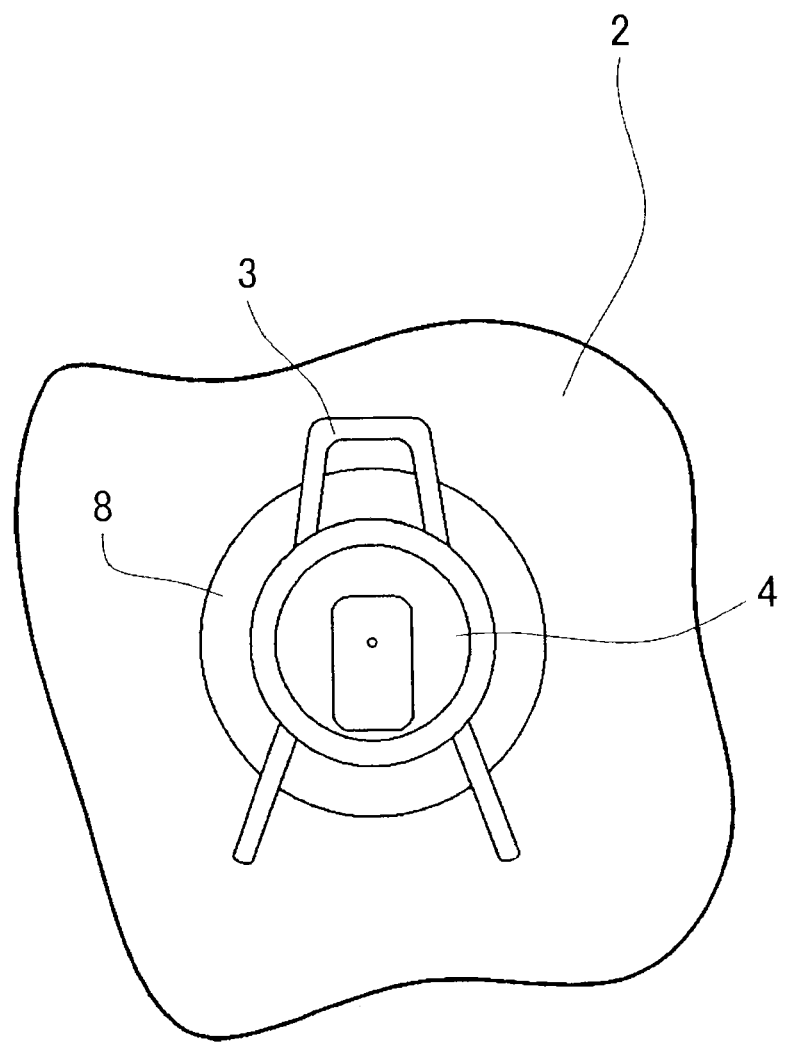
FIG. 7 is a front view of the clip properly attached to the connector according to the first example embodiment.
Figure 8:
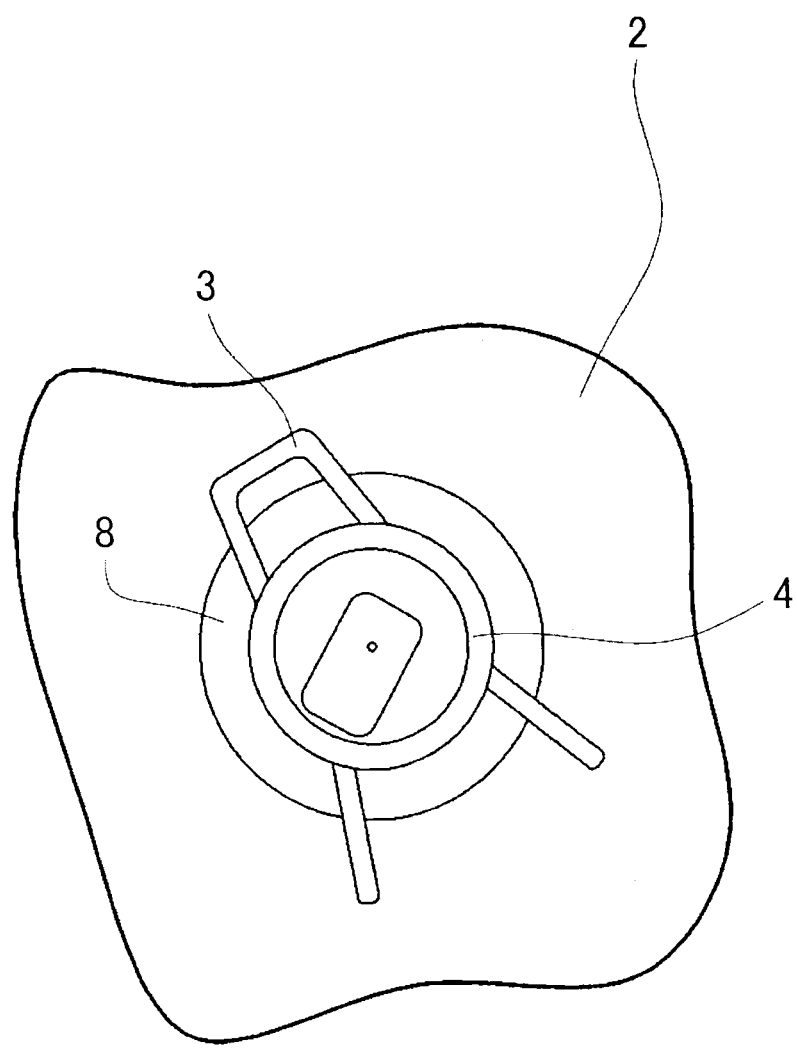
FIG. 8 is a front view of the clip properly attached to the connector according to the first example embodiment.

FIGS. 7 and 8 are views of the connector 4 mounted to the oil pan 2 by the clip 3 being attached to the clip attaching groove 19. As shown in FIGS. 7 and 8, the clip 3 and the connector 4 are both able to rotate freely with respect to the raised portion 8 of the oil pan 2, with the axial direction 17A (see also FIG. 1) as the rotational axis.

As described above, in this example embodiment, the spring restoring force of the clip 3 is set relatively low so that the clip 3 can be pushed into the clip attaching groove 19 with one finger when attaching the clip 3 to the connector 4. As a result, an attachment abnormality (i.e., improper attachment) of the clip 3 with respect to the connector 4, such as one of those shown in FIGS. 9 to 13, may occur.

Figure 9:
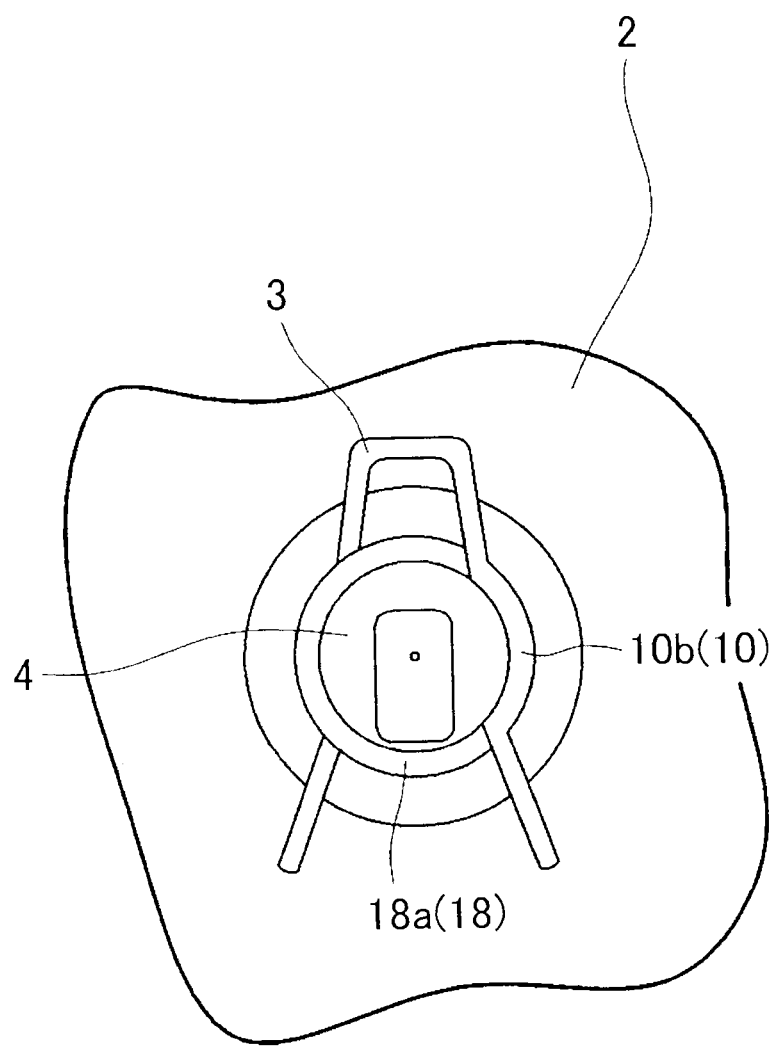
FIG. 9 is a front view of the clip improperly attached to the connector according to the first example embodiment.

In FIG. 9, the arced portion 10b of one of the opposing portions 10, from among the pair of opposing portions 10 of the clip 3, is not fitted in the clip attaching groove 19 of the connector 4, but is instead riding up on the inclined outer peripheral surface 18a of the insertion guiding portion 18.

Figure 10:
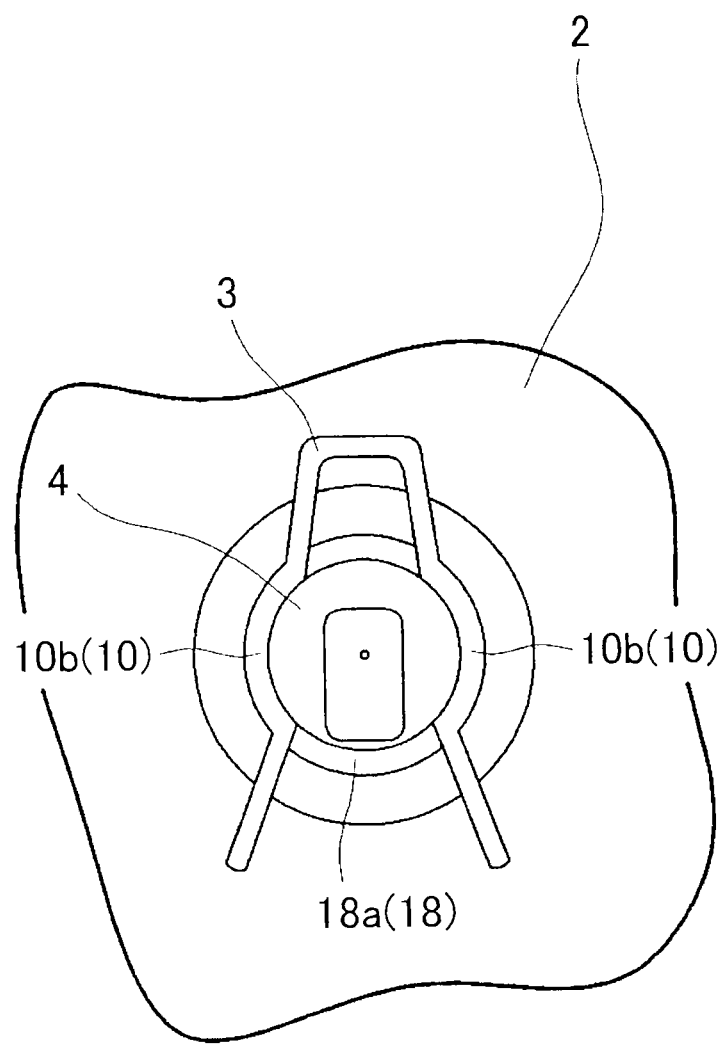
FIG. 10 is a front view of the clip improperly attached to the connector according to the first example embodiment.

In FIG. 10, neither of the arced portions 10b of the pair of opposing portions 10 of the clip 3 are fitted in the clip attaching groove 19 of the connector 4. Instead, both of the arced portions 10b of the clip 3 are riding up on the inclined outer peripheral surface 18a of the insertion guiding portion 18.

Figure 11:
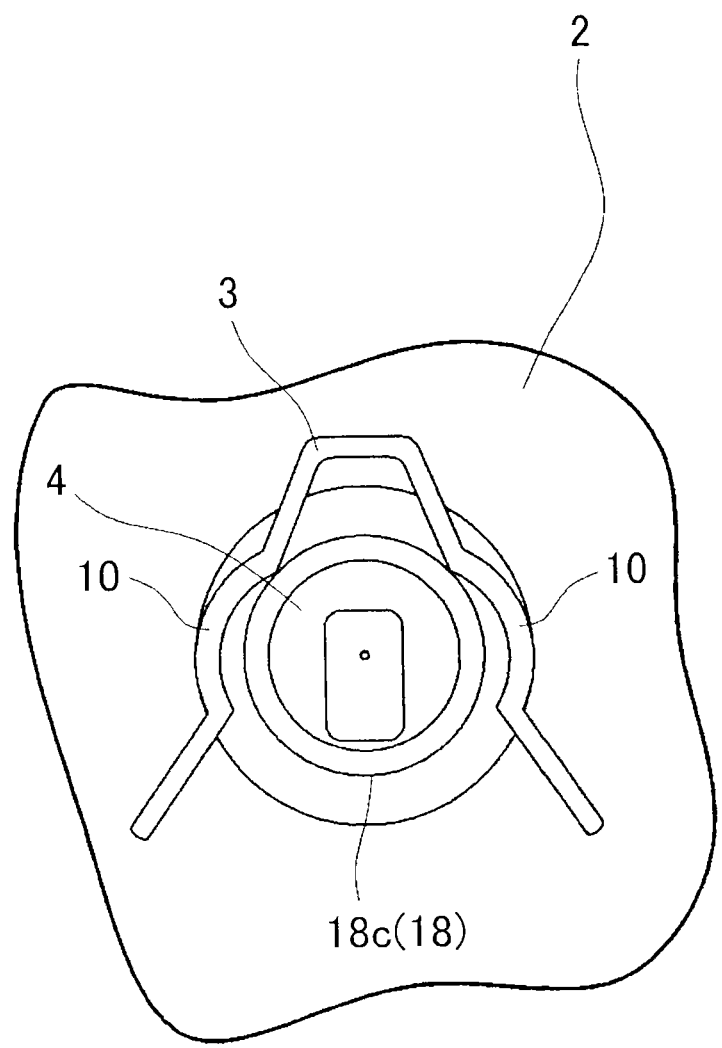
FIG. 11 is a front view of the clip improperly attached to the connector according to the first example embodiment.

In FIG. 11, neither of the arced portions 10b of the pair of opposing portions 10 of the clip 3 are fitted in the clip attaching groove 19 of the connector 4. Instead, both of the arced portions 10b of the clip 3 are riding up on the straight outer peripheral surface 18c of the insertion guiding portion 18.

Figure 12:
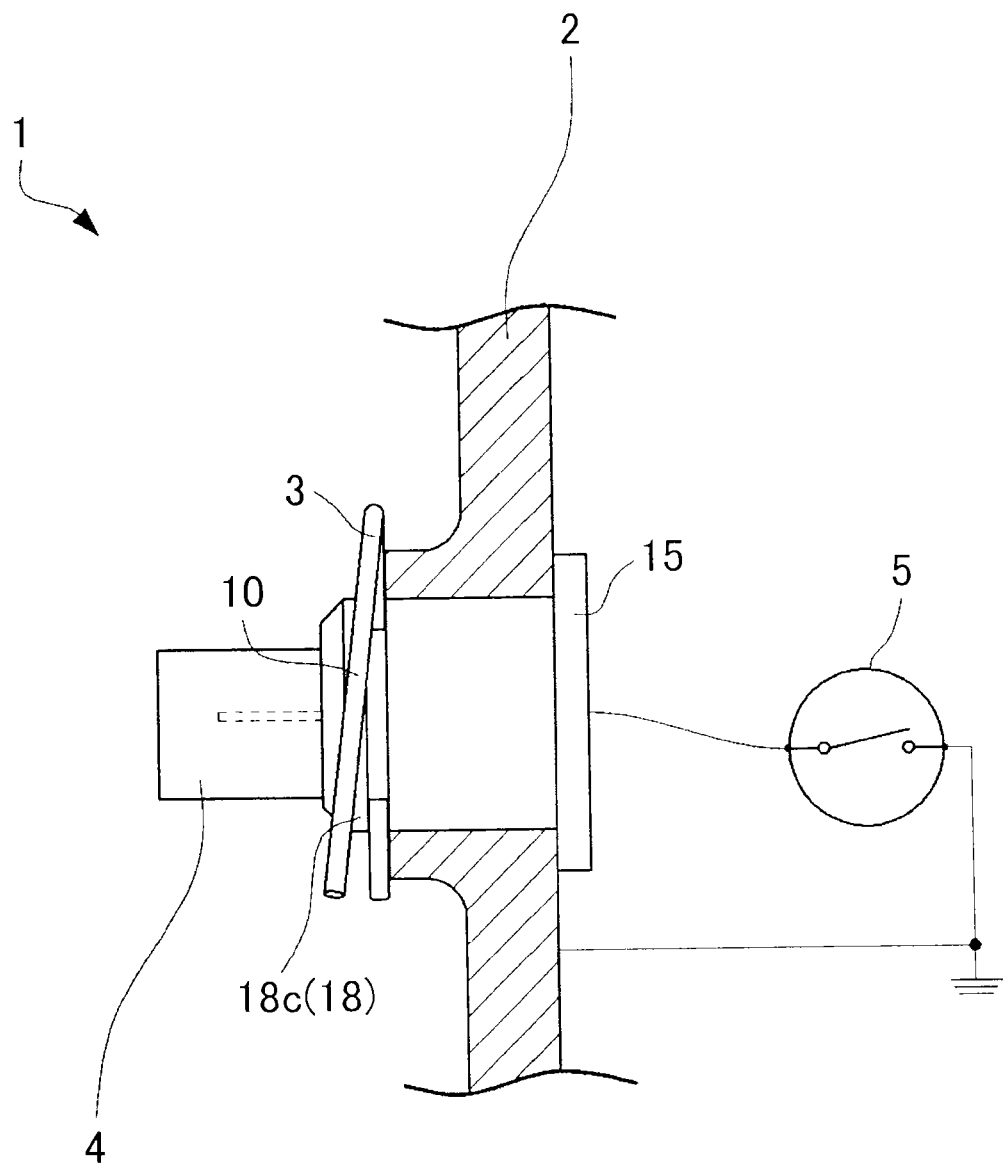
FIG. 12 is a side sectional view of the clip improperly attached to the connector according to the first example embodiment.

In FIG. 12, the arced portion 10b of one of the opposing portions 10, from among the pair of opposing portions 10 of the clip 3, is not fitted in the clip attaching groove 19 of the connector 4, but is instead riding up on the straight outer peripheral surface 18c of the insertion guiding portion 18.

Figure 13:
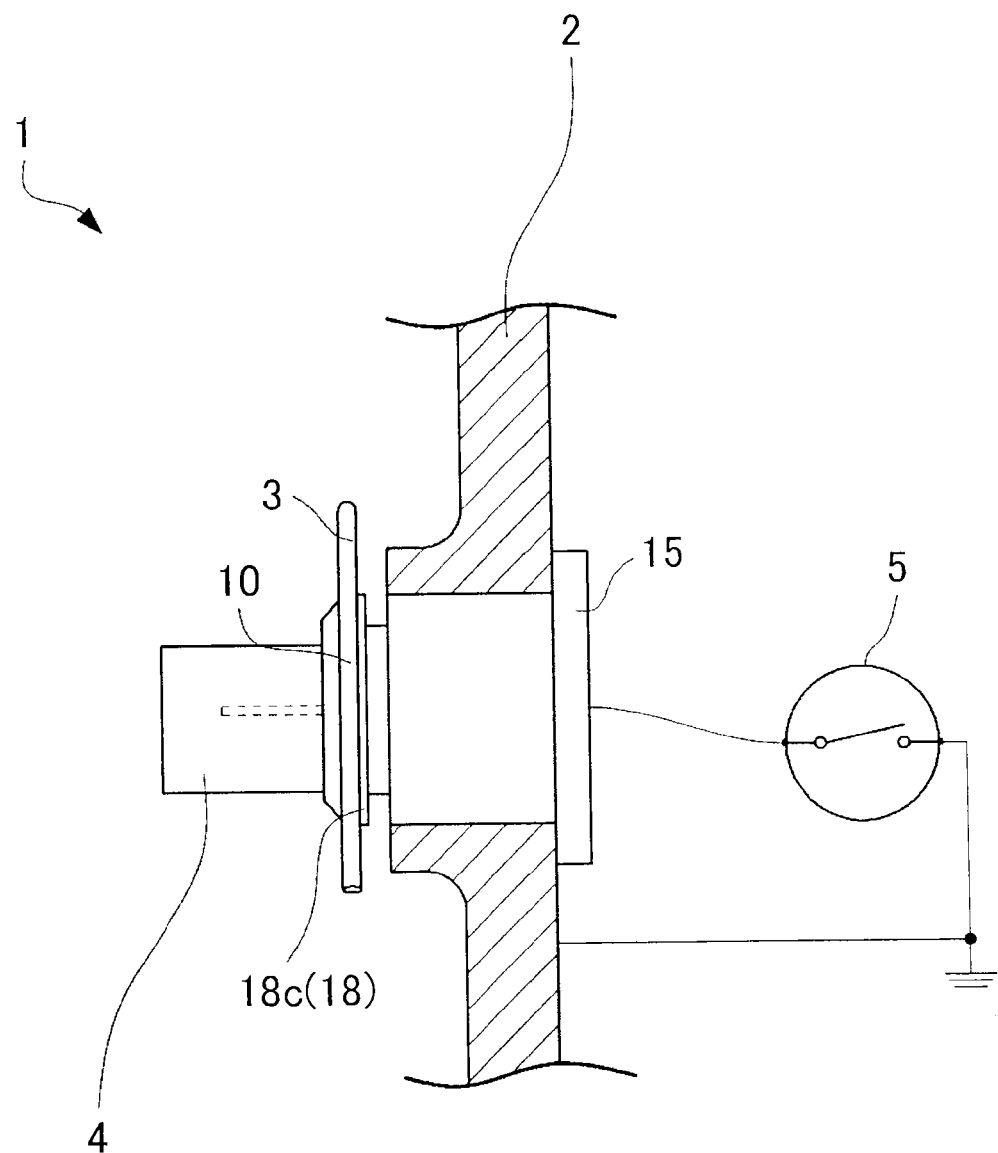
FIG. 13 is a side sectional view of the clip improperly attached to the connector according to the first example embodiment.

In FIG. 13, neither of the arced portions 10b of the pair of opposing portions 10 of the clip 3 are fitted in the clip attaching groove 19 of the connector 4. Instead, both of the arced portions 10b of the clip 3 are riding up on the straight outer peripheral surface 18c of the insertion guiding portion 18.

Attachment abnormalities such as those shown in FIGS. 9 to 13 may be detected by image processing, for example. However, if an attempt is made to deal with an attachment abnormality by image processing, it is necessary to store image patterns of all conceivable attachment abnormalities in an image processing algorithm. Also, with attachment abnormalities such as those shown in FIGS. 9 and 10, sufficient information is unable to be obtained by just a front view image, so a side view image such as those in FIGS. 12 and 13 is essential, which is extremely troublesome. What is more, as shown in FIGS. 7 and 8, the clip 3 and the connector 4 are able to rotate freely with respect to the raised portion 8 of the oil pan 2, so the postures of the clip 3 and the connector 4 with respect to the oil pan 2 vary with each product, which also makes image processing difficult.

Figure 14:
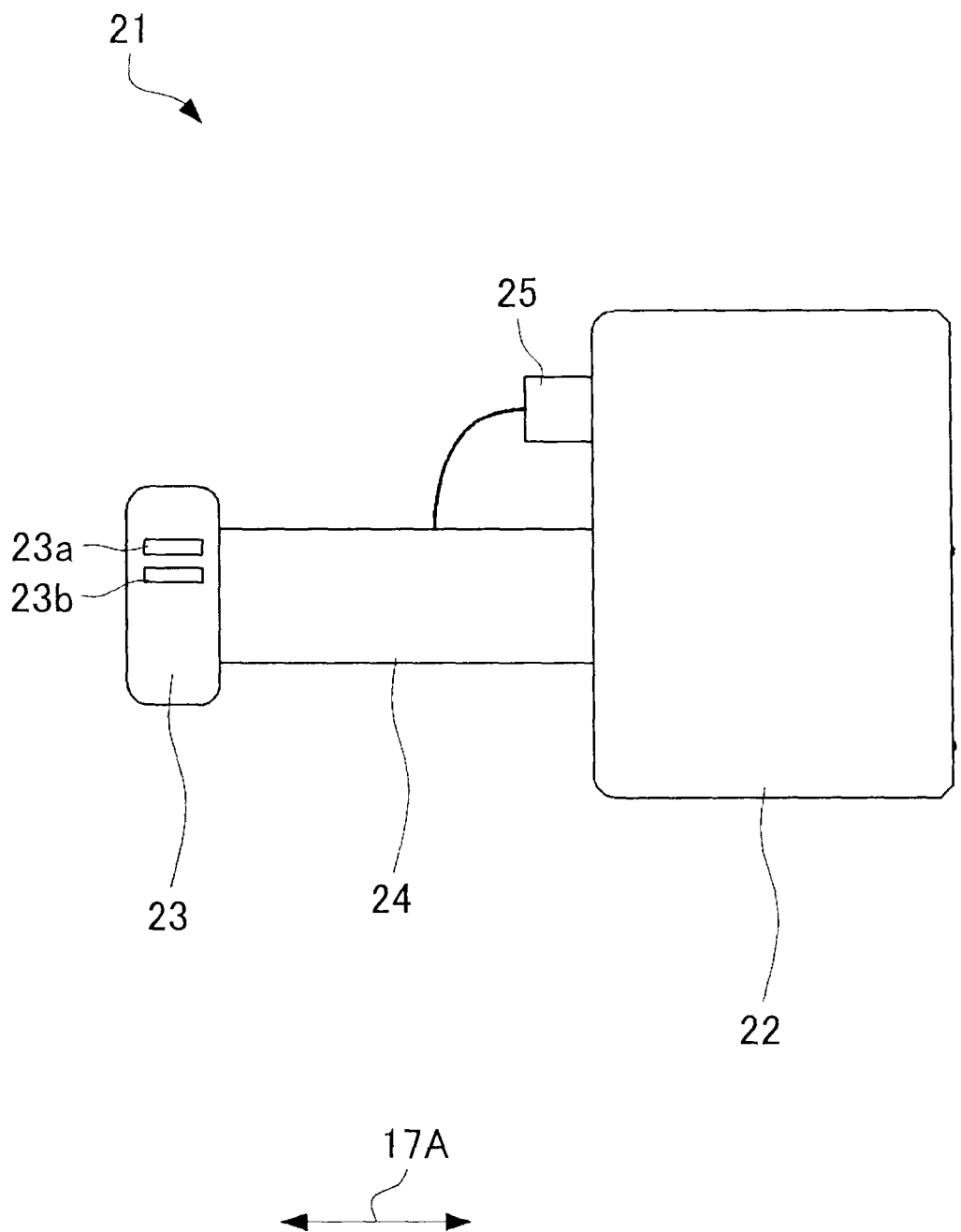
FIG. 14 is a side view of a mounting-result inspection tool according to the first example embodiment.
Figure 15:
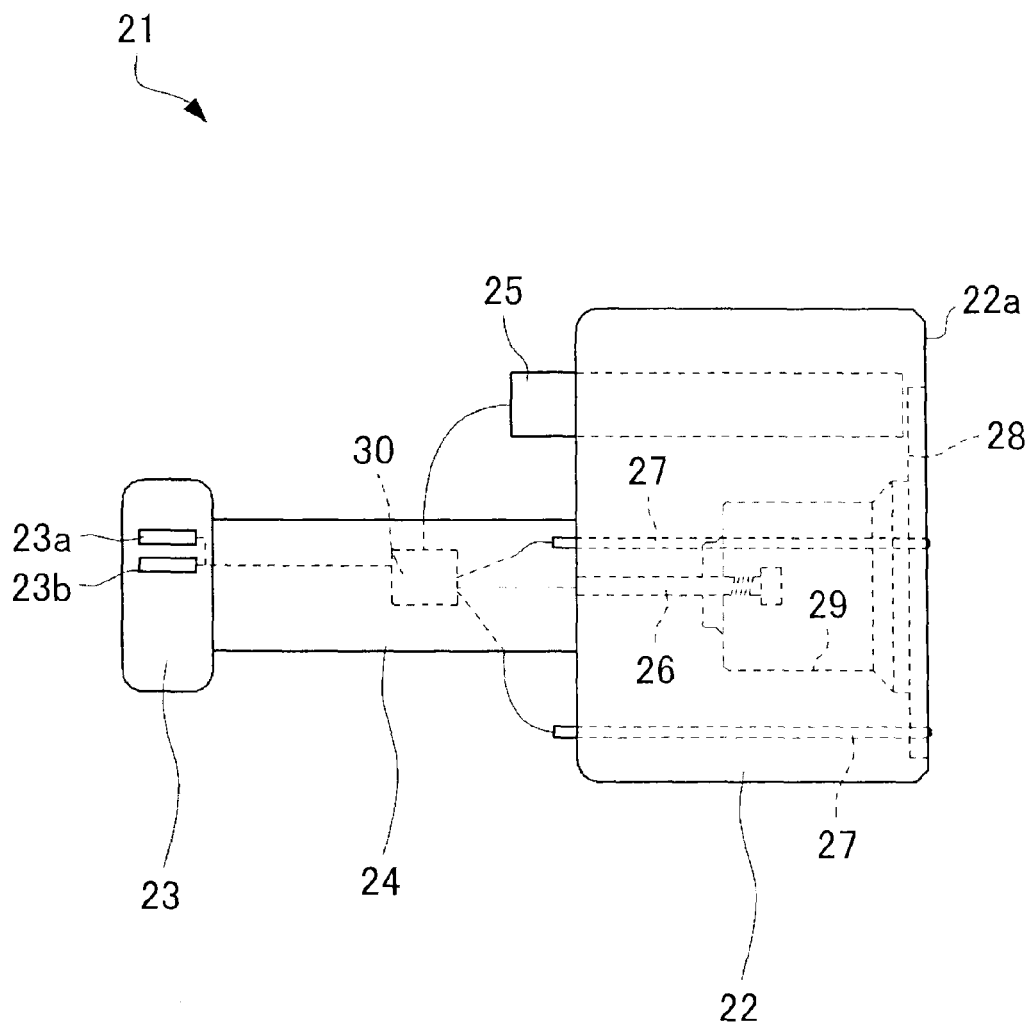
FIG. 15 is a side view of the mounting-result inspection tool according to the first example embodiment.
Figure 17:
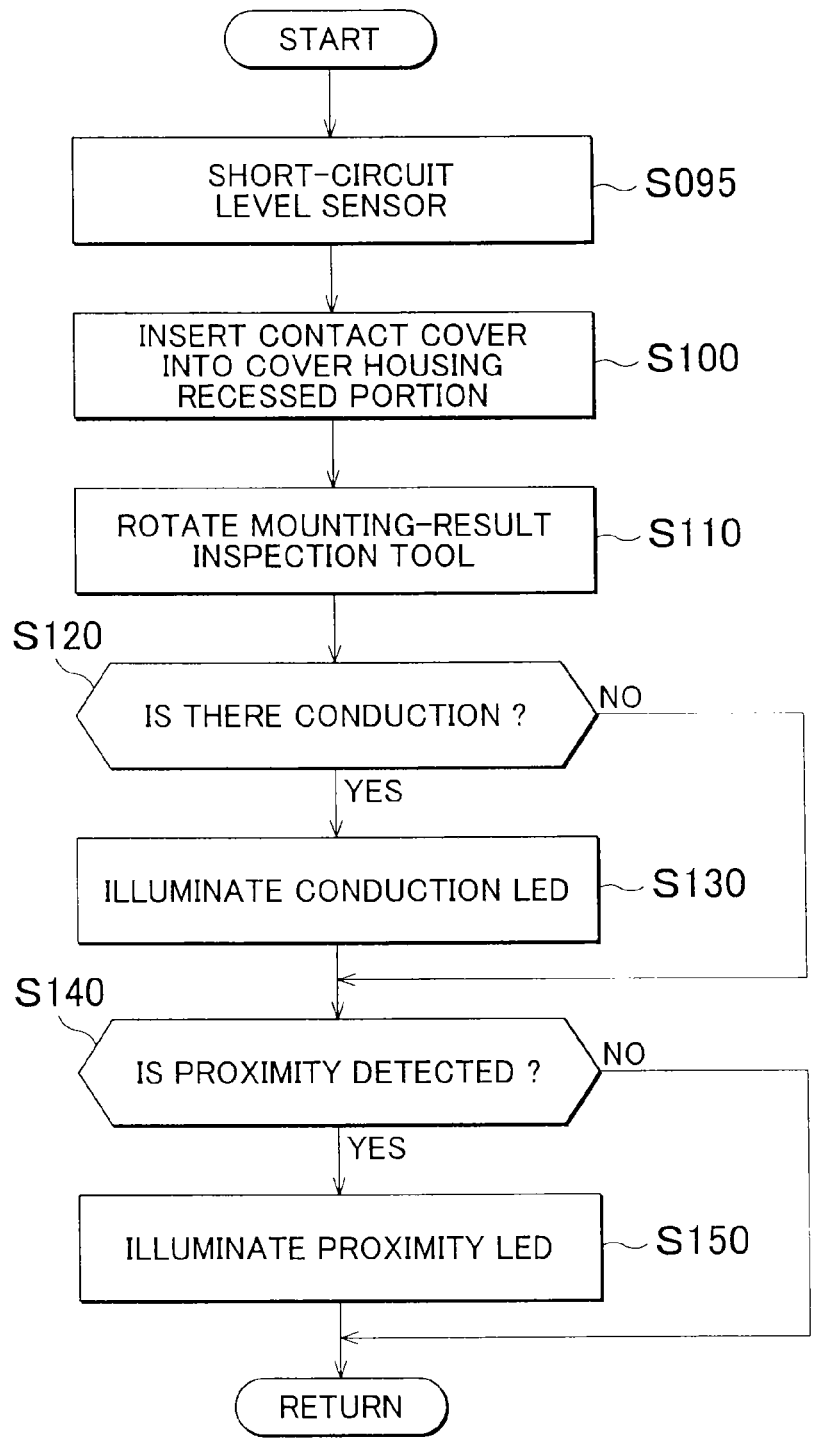
FIG. 17 is a flowchart illustrating the flow of a mounting-result inspection method according to the first example embodiment.

Therefore, the inventors of this invention devised a mounting-result inspection tool 21 shown in FIGS. 14 to 16. Hereinafter, the mounting-result inspection tool 21 will be described with reference to FIGS. 14 to 16.

As shown in FIGS. 14 to 16, the mounting-result inspection tool 21 includes an inspection tool main body 22, a nob 23, an extension 24, a proximity sensor 25 (a housing detector), a contact probe 26 (first probe, probe), and three earth probes 27 (a second probe, probe).

The inspection tool main body 22 is a block body made of insulating resin material. As shown in FIGS. 15 and 16, a clip housing recessed portion 28 (a recessed portion) that has a shape complementary to that of the clip 3 (see also FIGS. 7 and 8) that has been properly attached to the clip attaching groove 19, and a cover housing recessed portion 29 that is able to house the contact cover 16 of the connector 4, are both formed on the inspection tool main body 22. Here, the clip housing recessed portion 28 that has a shape complementary to that of the clip 3 that has been properly attached to the clip attaching groove 19 refers to the clip housing recessed portion 28 that tightly houses the clip 3 that has been properly attached to the clip attaching groove 19. That is, the clip housing recessed portion 28 that has a shape complementary to that of the clip 3 that has been properly attached to the clip attaching groove 19 refers to the clip housing recessed portion 28 that is able to house the clip 3 only when the orientation of the clip 3 that has been properly attached to the clip attaching groove 19, with respect to the clip housing recessed portion 28, is a specific orientation. The inspection tool main body 22 has a tip end surface 22a that is a surface that opposes the oil pan 2.

The nob 23 is a portion that is grasped by a worker carrying out a mounting-result inspection. A conduction LED 23a and a proximity LED 23b are provided on the nob 23.

The extension 24 is a portion that connects the inspection tool main body 22 and the nob 23. A microcomputer 30 (a conduction tester) is built into the extension 24.

The proximity sensor 25 is a sensor that detects that the clip 3 is housed in the clip housing recessed portion 28 of the inspection tool main body 22. In this example embodiment, the clip 3 is made of magnetic material, and the oil pan 2 is made of nonmagnetic material. Therefore, the proximity sensor 25 that is used detects that the clip 3 is housed in the clip housing recessed portion 28 of the inspection tool main body 22, using the difference between the sensor characteristic for magnetic material and the sensor characteristic for nonmagnetic material. An inductive proximity sensor is one possibility for the kind of sensor. However, instead of this, any sensor may be used as long as the sensor characteristic for magnetic material is different from the sensor characteristic for nonmagnetic material. In this example embodiment, the proximity sensor 25 performs the detection on the connecting portion 11 of the clip 3 housed in the clip housing recessed portion 28 of the inspection tool main body 22.

The contact probe 26 extends in the axial direction 17A, and is configured to advance and retreat slightly in the axial direction 17A. The contact probe 26 is configured to contact the contact 12 of the connector 4 when the clip 3 that is properly attached to the clip attaching groove 19 is housed in the clip housing recessed portion 28 of the inspection tool main body 22, and not contact the contact 12 of the connector 4 when the clip 3 is improperly attached to the clip attaching groove 19. That is, the contact probe 26 is configured to reach the contact 12 of the connector 4 when the clip 3 that is properly attached to the clip attaching groove 19 is housed in the clip housing recessed portion 28 of the inspection tool main body 22. On the other hand, the contact probe 26 is configured to not reach the contact 12 of the connector 4 when the clip 3 is improperly attached to the clip attaching groove 19.

The three earth probes 27 extend in the axial direction 17A. The three earth probes 27 are slightly exposed on the tip end surface 22a side of the inspection tool main body 22.

Each earth probe 27 is configured to contact the seating surface 8a of the raised portion 8 of the oil pan 2 when the clip 3 that is properly attached to the clip attaching groove 19 is housed in the clip housing recessed portion 28 of the inspection tool main body 22, and to not contact the seating surface 8a of the raised portion 8 of the oil pan 2 when the clip 3 is improperly attached to the clip attaching groove 19. That is, each earth probe 27 is configured to reach the seating surface 8a of the raised portion 8 of the oil pan 2 when the clip 3 that is properly attached to the clip attaching groove 19 is housed in the clip housing recessed portion 28 of the inspection tool main body 22. On the other hand, each earth probe 27 is configured to not reach the seating surface 8a of the raised portion 8 of the oil pan 2 when the clip 3 is improperly attached to the clip attaching groove 19.

The conduction LED 23a, the proximity LED 23b, the proximity sensor 25, the contact probe 26, and the three earth probes 27 are connected to the microcomputer 30. The microcomputer 30 illuminates the proximity LED 23b when the proximity sensor 25 detects that the clip 3 is housed in the clip housing recessed portion 28 of the inspection tool main body 22. The microcomputer 30 illuminates the conduction LED 23a when the contact probe 26 and any of the earth probes 27, from among the three earth probes 27, are electrically connected (i.e., when there is conduction therebetween).

Next, a mounting-result inspection method for inspecting whether the clip 3 is properly attached to the clip attaching groove 19 using the mounting-result inspection tool 21 will be described with reference to FIGS. 17 to 22.

Figure 18:
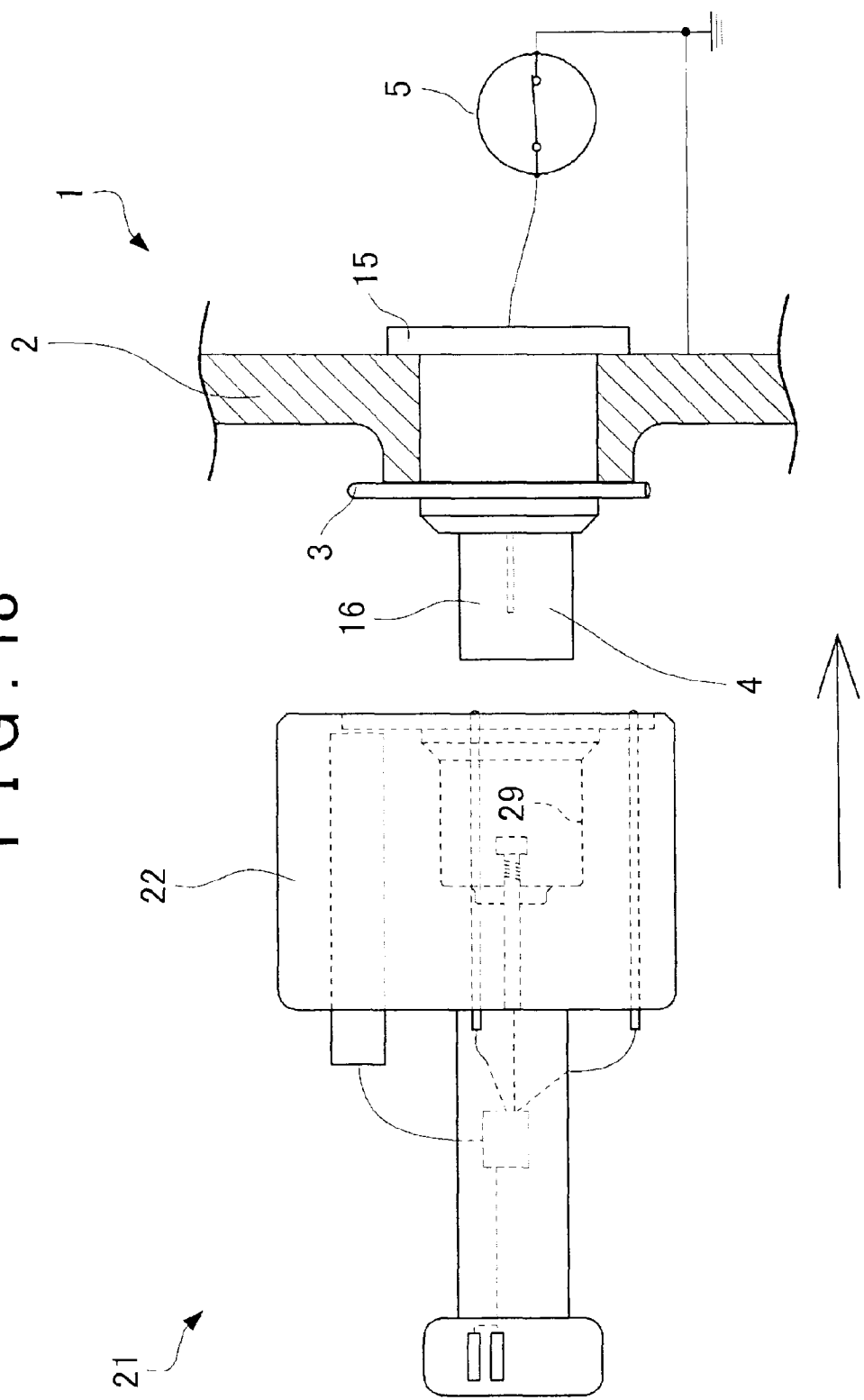
FIG. 18 is a side view illustrating the manner in which the mounting-result inspection tool is fitted to a contact cover of the connector according to the first example embodiment.
Figure 19:
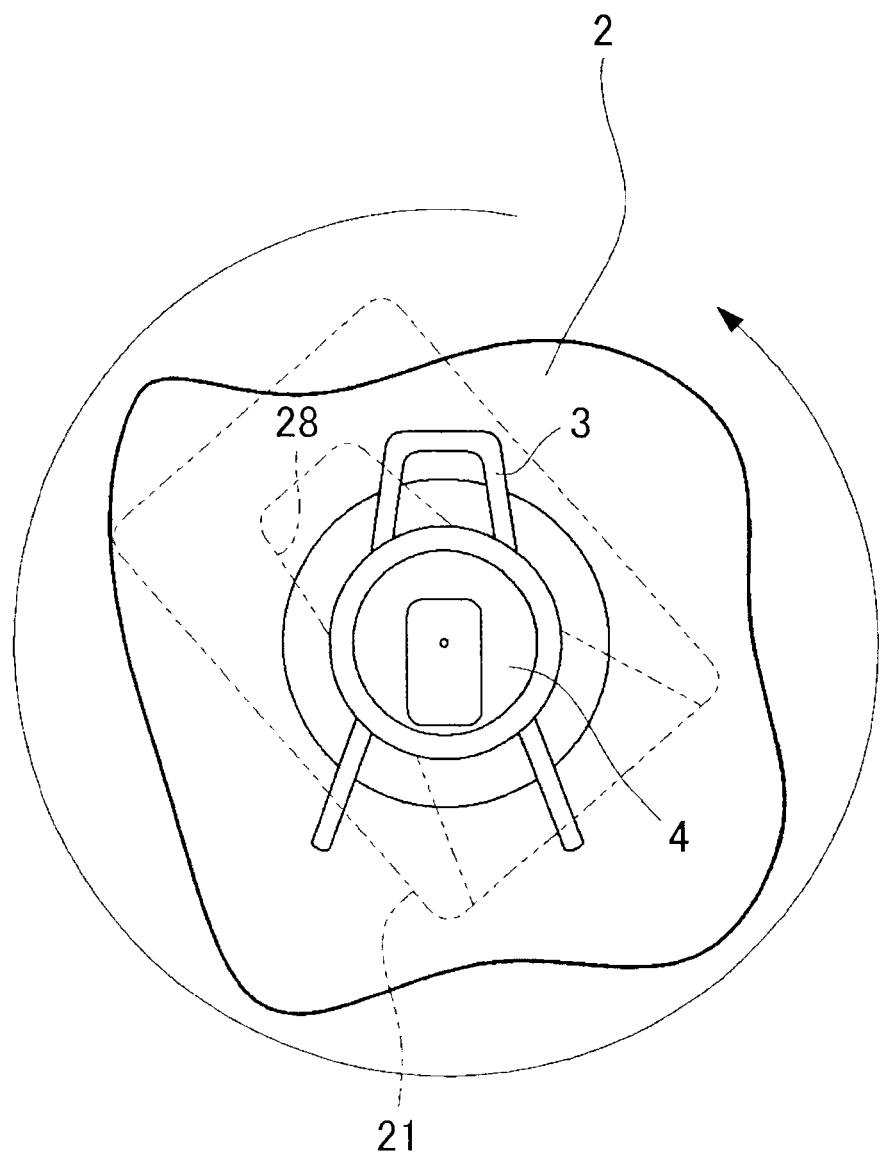
FIG. 19 is a front view illustrating the manner in which the mounting-result inspection tool is rotated with respect to the clip according to the first example embodiment.

First, at the time of inspection, the level sensor 5 is short-circuited in advance, as shown in FIG. 18 (S095). Therefore, the contact 12 of the connector 4 is grounded, and the oil pan 2 is also grounded, so the contact 12 of the connector 4 and the oil pan 2 are electrically connected. Next, the mounting-result inspection tool 21 is brought close to the connector 4, and the contact cover 16 of the connector 4 is inserted into the cover housing recessed portion 29 of the inspection tool main body 22 of the mounting-result inspection tool 21 (S100). Next, at attempt is made to house the clip 3 in the clip housing recessed portion 28 of the inspection tool main body 22, as shown in FIG. 19 (S110). More specifically, the mounting-result inspection tool 21 is rotated so that the orientation of the clip housing recessed portion 28 of the inspection tool main body 22 matches the orientation of the clip 3 (S110).

Figure 20:
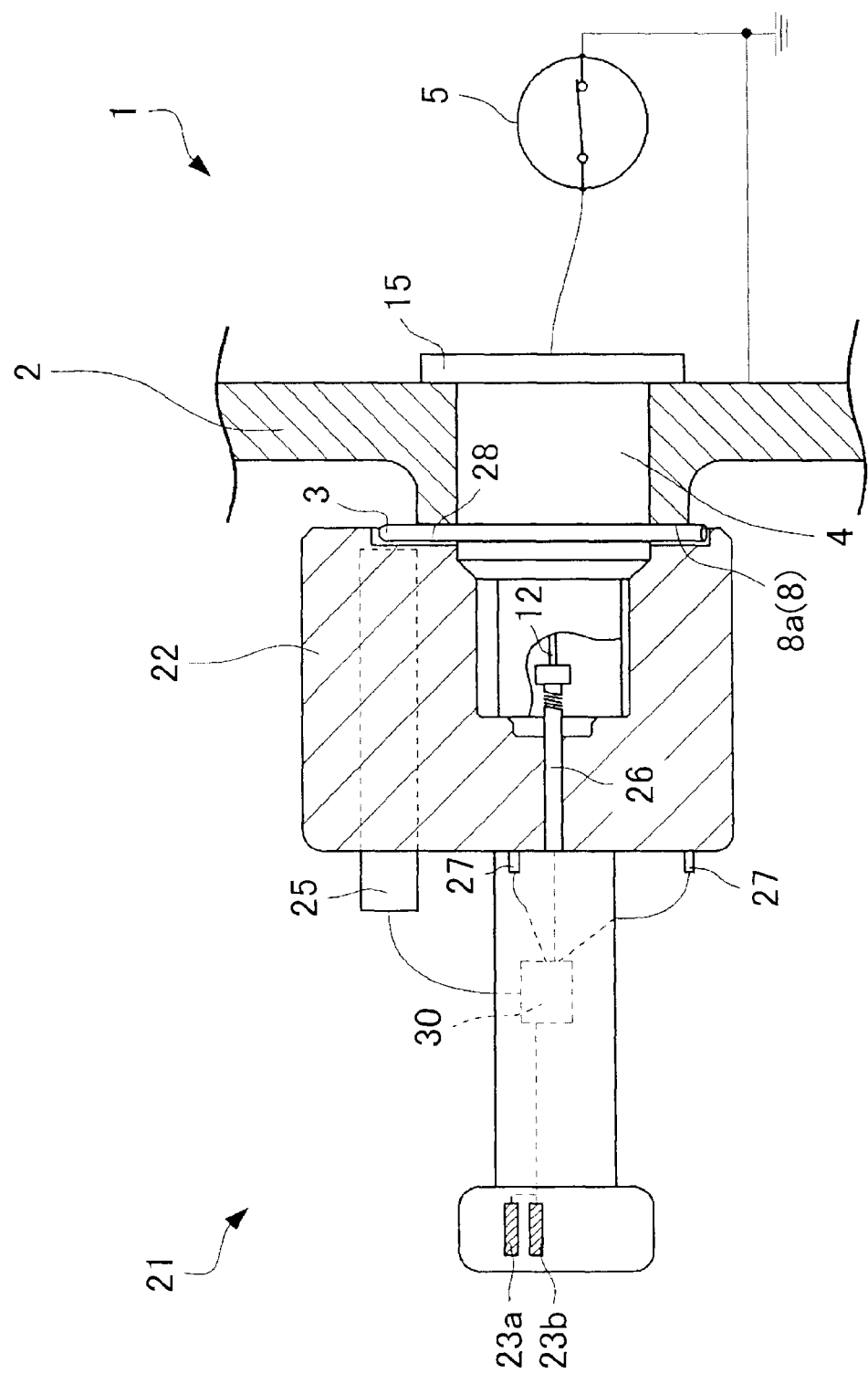
FIG. 20 is a side sectional view illustrating the manner in which the mounting-result inspection tool is fitted to the contact cover of the connector according to the first example embodiment.

As shown in FIG. 20, when the clip 3 is properly attached to the clip attaching groove 19, the clip 3 is housed in the clip housing recessed portion 28 of the inspection tool main body 22. Also, the contact probe 26 contacts the contact 12 of the connector 4, and the earth probes 27 contacts the seating surface 8a of the raised portion 8, so the contact probe 26 and the earth probes 27 are electrically connected (i.e., there is conduction therebetween) (i.e., YES in S120), and the microcomputer 30 illuminates the conduction LED 23a (S130). Also, because the clip 3 is housed in the clip housing recessed portion 28 of the inspection tool main body 22, the proximity sensor 25 detects that the clip 3 is housed in the clip housing recessed portion 28 of the inspection tool main body 22 (i.e., YES in S140), and the microcomputer 30 illuminates the proximity LED 23b (S150). A worker is able to confirm that the clip 3 is properly attached to the clip attaching groove 19 by confirming that both the conduction LED 23a and the proximity LED 23b are illuminated.

Figure 21:
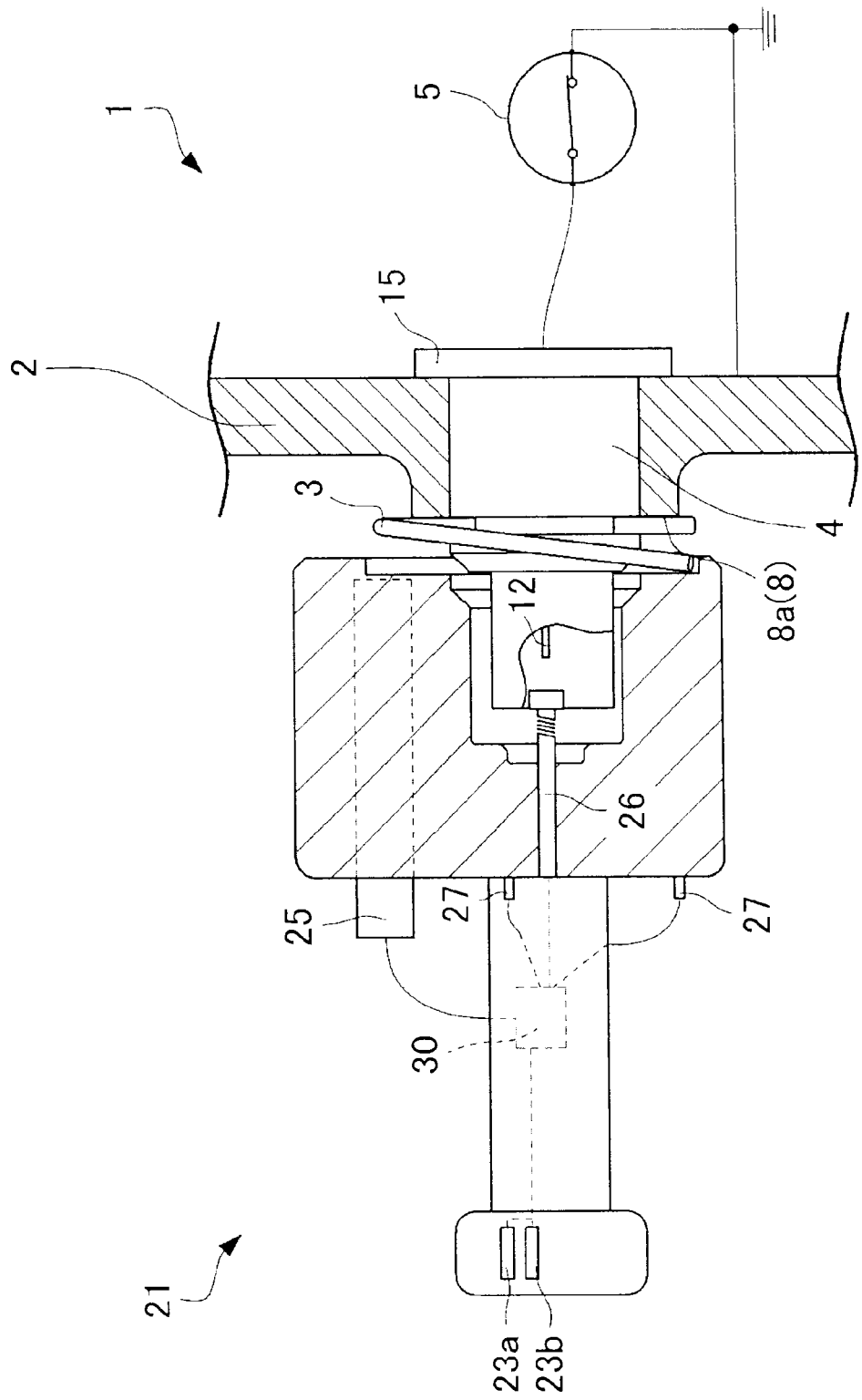
FIG. 21 is a side sectional view illustrating the manner in which the mounting-result inspection tool is fitted to the contact cover of the connector, when the clip is improperly attached to the connector according to the first example embodiment.

In contrast to this, as shown in FIG. 21, when the clip 3 is not properly attached to the clip attaching groove 19, but is instead improperly attached thereto, the contact probe 26 does not reach the contact 12 of the connector 4, and the earth probes 27 also do not reach the seating surface 8a of the raised portion 8, so the contact probe 26 and the earth probes 27 are not electrically connected (i.e., there is no conduction therebetween) (i.e., NO in S120), and the microcomputer 30 does not illuminate the conduction LED 23a. A worker is able to confirm that the clip 3 is improperly attached to the clip attaching groove 19 by confirming that the conduction LED 23a is not illuminated.

Figure 22:
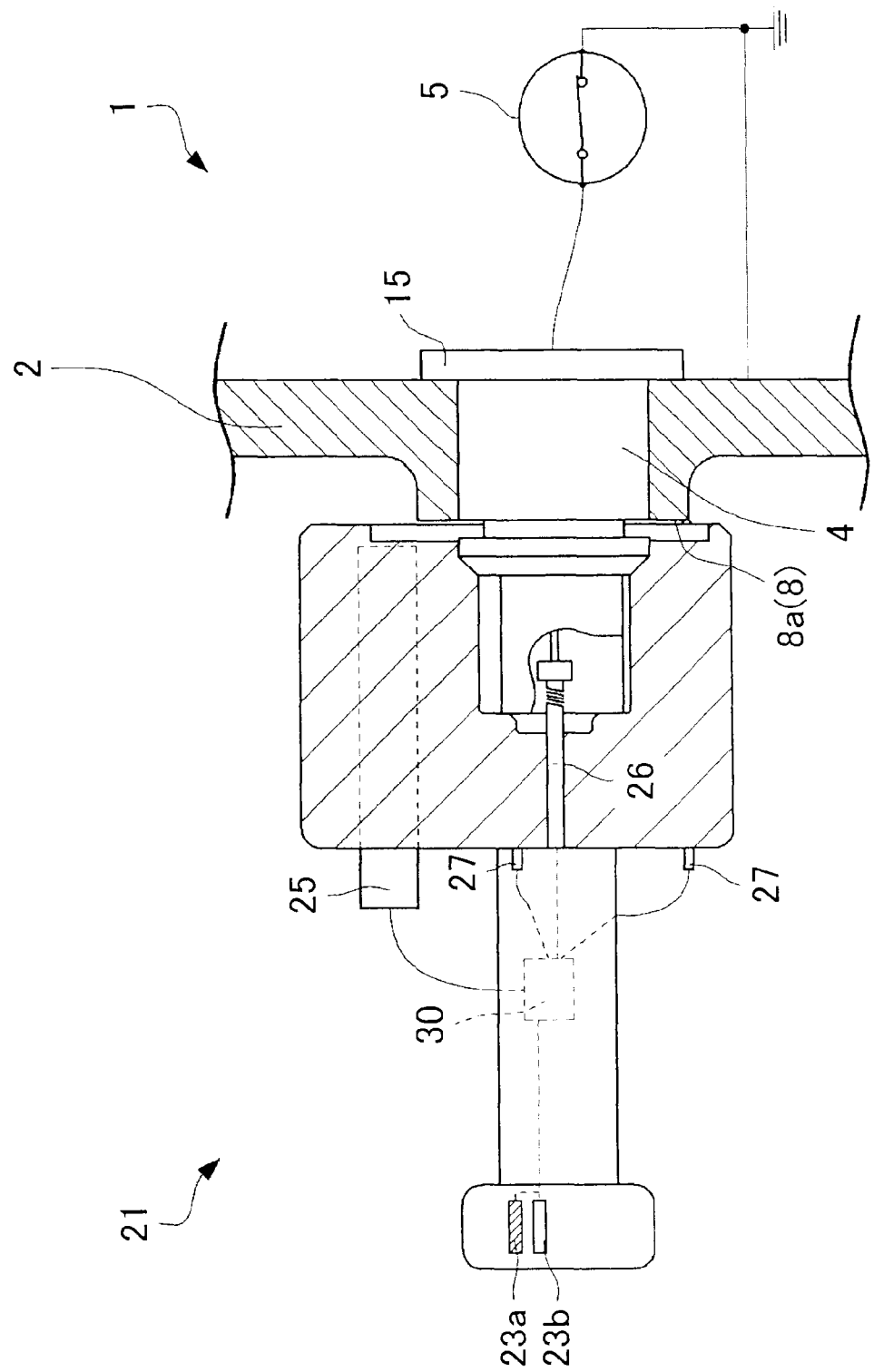
FIG. 22 is a side sectional view illustrating the manner in which the mounting-result inspection tool is fitted to the contact cover of the connector when the clip has forgotten to be attached to the connector according to the first example embodiment.

Also, as shown in FIG. 22, if the clip 3 was never attached to the connector 4 in the first place, the contact probe 26 will contact the contact 12 of the connector 4, and the earth probes 27 will contact the seating surface 8a of the raised portion 8, so the contact probe 26 and the earth probes 27 will be electrically connected (i.e., there will be conduction therebetween) (i.e., YES in S120), and thus the microcomputer 30 will illuminate the conduction LED 23a (S130). However, because the clip 3 is not housed in the clip housing recessed portion 28 of the inspection tool main body 22, the proximity sensor 25 will not detect that the clip 3 is housed in the clip housing recessed portion 28 of the inspection tool main body 22 (i.e., NO in S140), so the microcomputer 30 will not illuminate the proximity LED 23b. A worker is able to confirm that the clip 3 was never attached to the connector 4 in the first place by confirming that the conduction LED 23a is illuminated but the proximity LED 23b is not illuminated.

Heretofore, the first example embodiment of the example embodiment has been described. This example embodiment has the characteristics described below.

(1) The connector mounting structure 1 includes the oil pan 2 having the connector mounting hole 7, the clip 3 (an elastic body) that extends in a general U-shape, and the connector 4. The connector 4 is arranged inside the oil pan 2, and is used to bring the harness 20 (wiring) from the level sensor 5 (a level detection sensor) that detects the oil level in the oil pan 2, out of the oil pan 2. The connector 4 includes the contact 12 that is electrically connected to the level sensor 5, and the housing 13 that retains the contact 12. The housing 13 has the housing portion 17 that is housed in the connector mounting hole 7, and the clip attaching groove 19 (an elastic body attaching groove) and the flange portion 15 (a catching portion) that are arranged sandwiching the housing portion 17. The clip 3 and the flange portion 15 sandwich the oil pan 2, such that the connector 4 is attached to the oil pan 2, by the housing portion 17 being housed in the connector mounting hole 7 and the clip 3 being attached to the clip attaching groove 19. The structure described above enables the connector 4 for bringing the harness 20 from the level sensor 5 out of the oil pan 2, to be inexpensively mounted to the oil pan 2.

(2) The mounting-result inspection tool 21 for inspecting whether the clip 3 is properly attached to the clip attaching groove 19 includes the inspection tool main body 22 and the probe. The inspection tool main body 22 has the clip housing recessed portion 28 (a recessed portion) that has a shape complementary to that of the clip that has been properly attached to the clip attaching groove 19. The probe contacts the contact 12 of the connector 4, or the oil pan 2, when the clip 3 that is properly attached to the clip attaching groove 19 is housed in the clip housing recessed portion 28 of the inspection tool main body 22, and does not contact the contact 12 of the connector 4, or the oil pan 2, when the clip 3 is improperly attached to the clip attaching groove 19. The structure described above makes it possible to inspect whether the clip 3 is properly attached to the clip attaching groove 19, by detecting that the probe is contacting the contact 12 of the connector 4, or the oil pan 2.

In this example embodiment, the probe corresponds to the contact probe 26 and the earth probes 27.

(3) The mounting-result inspection tool 21 that inspects whether the clip 3 is properly attached to the clip attaching groove 19 includes the inspection tool main body 22, the contact probe 26 (the first probe), the earth probes 27 (the second probe), and the microcomputer 30 (the conduction tester). The inspection tool main body 22 has the clip housing recessed portion 28 (a recessed portion) that has a shape complementary to that of the clip that has been properly attached to the clip attaching groove 19. The contact probe 26 (the first probe) contacts the contact 12 of the connector 4 when the clip 3 that is properly attached to the clip attaching groove 19 is housed in the clip housing recessed portion 28 of the inspection tool main body 22, and does not contact the contact 12 of the connector 4 when the clip 3 is improperly attached to the clip attaching groove 19. The earth probes 27 (the second probe) contact the seating surface 8a of the raised portion 8 of the oil pan 2 when the clip 3 that is properly attached to the clip attaching groove 19 is housed in the clip housing recessed portion 28 of the inspection tool main body 22, and do not contact the seating surface 8a of the raised portion 8 of the oil pan 2 when the clip 3 is improperly attached to the clip attaching groove 19. The microcomputer 30 (the conduction tester) inspects conduction between the contact probe 26 and the earth probes 27. The structure described above makes it possible to easily detect, using the microcomputer 30, that the contact probe 26 is contacting the contact 12 of the connector 4 and that the earth probes 27 are contacting the seating surface 8a of the raised portion 8 of the oil pan 2, when the contact 12 of the connector 4 is electrically connected to the seating surface 8a of the raised portion 8 of the oil pan 2 (i.e., when there is conduction therebetween), as shown in FIG. 18. As a result, it is possible to easily inspect whether the clip 3 is properly attached to the clip attaching groove 19.

In the example embodiment described above, three of the earth probes 27 are used, but it is also possible to use only one.

(4) The mounting-result inspection tool 21 also includes the proximity sensor 25 (housing detector) that detects that the clip 3 is housed in the clip housing recessed portion 28 of the inspection tool main body 22. This structure makes it possible to detect whether the clip 3 is present.

(5) The clip 3 is made of a metal that is magnetic material. The oil pan 2 is made of metal that is nonmagnetic material.

(6) The mounting-result inspection method for inspecting whether the clip 3 is properly attached to the clip attaching groove 19 in the connector mounting structure 1 using the mounting-result inspection tool 21 includes, in order, the housing step (S110) of attempting to house the clip 3 in the clip housing recessed portion 28 of the inspection tool main body 22, and the contact detecting step (S120) of detecting that the probe is contacting the contact 12 of the connector 4 or the seating surface 8a of the raised portion 8 of the oil pan 2. This method makes it possible to inspect whether the clip 3 is properly attached to the clip attaching groove 19.

In this example embodiment, the probe corresponds to the contact probe 26 and the earth probes 27.

(7) The mounting-result inspection method for inspecting whether the clip 3 is properly attached to the clip attaching groove 19 in the connector mounting structure 1 using the mounting-result inspection tool 21 includes, in order, the housing step (S110) of attempting to house the clip 3 in the clip housing recessed portion 28 of the inspection tool main body 22, and the conduction inspecting step (S120) of inspecting conduction between the contact probe 26 and the earth probes 27. According to this method, it is possible to easily detect that the contact probe 26 is contacting the contact 12 of the connector 4, and that the earth probes 27 are contacting the seating surface 8a of the raised portion 8 of the oil pan 2, when the contact 12 of the connector 4 is electrically connected to the seating surface 8a of the raised portion 8 of the oil pan 2 (i.e., when there is conduction therebetween), as shown in FIG. 18. As a result, it is easy to inspect whether the clip 3 is properly attached to the clip attaching groove 19.

(8) The mounting-result inspection method for inspecting whether the clip 3 is properly attached to the clip attaching groove 19 in the connector mounting structure 1 using the mounting-result inspection tool 21 includes, in order, the short-circuiting step (S095) of electrically connecting the contact 12 of the connector 4 to the oil pan 2 by short-circuiting the level sensor 5, the housing step (S110) of attempting to house the clip 3 in the clip housing recessed portion 28 of the inspection tool main body 22, and the conduction inspecting step (S120) of inspecting conduction between the contact probe 26 and the earth probes 27. According to this method, it is possible to easily detect that the contact probe 26 is contacting the contact 12 of the connector 4, and that the earth probes 27 are contacting the seating surface 8a of the raised portion 8 of the oil pan 2, so it is easy to inspect whether the clip 3 is properly attached to the clip attaching groove 19.

The order in which the short-circuiting step (S095) and the housing step (S110) are executed may also be switched.

(9) The mounting-result inspection method also includes the housing detecting step (S140) of detecting that the clip 3 is housed in the clip housing recessed portion 28 of the inspection tool main body 22. This structure makes it possible to detect whether the clip 3 is present.

(10) The clip 3 is made of a metal that is magnetic material. The oil pan 2 is made of metal that is nonmagnetic material.

(11) In the housing step (S110), the mounting-result inspection tool 21 is rotated so that the orientation of the clip housing recessed portion 28 of the inspection tool main body 22 matches the orientation of the clip 3.

Second Example Embodiment

Next, a second example embodiment of the invention will be described with reference to FIG. 23. In the first example embodiment, the clip 3 is formed bent in a general U-shape, as shown in FIG. 3. Instead of this, the clip 3 may be formed as a so-called E-clip that has a general E-shape, as shown in FIG. 23. That is, as shown in FIG. 23, the clip 3 has a pair of arms 40 and three pawl portions 41. The pair of arms 40 extend in an arc-shape and oppose each other. Because the pair of arms 40 oppose each other, it may also be noted that the clip 3 of this example embodiment is also formed in a general U-shape. The three pawl portions 41 are portions that are housed in the clip attaching groove 19 of the connector 4 (see also FIG. 5).

Third Example Embodiment

Figure 24:
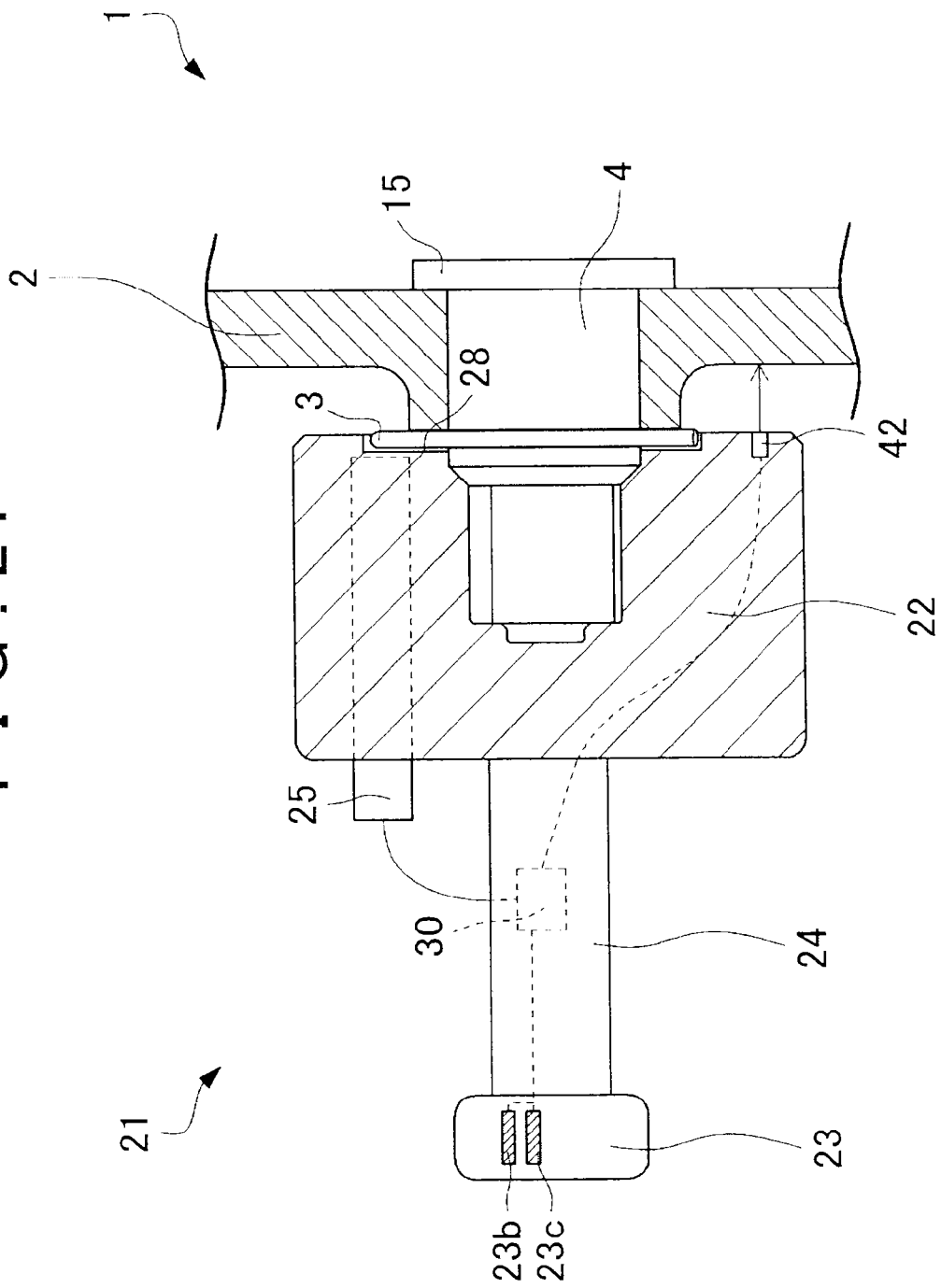
FIG. 24 is a side sectional view of a mounting-result inspection tool fitted to a contact cover of a connector according to a third example embodiment of the invention.
Figure 25:
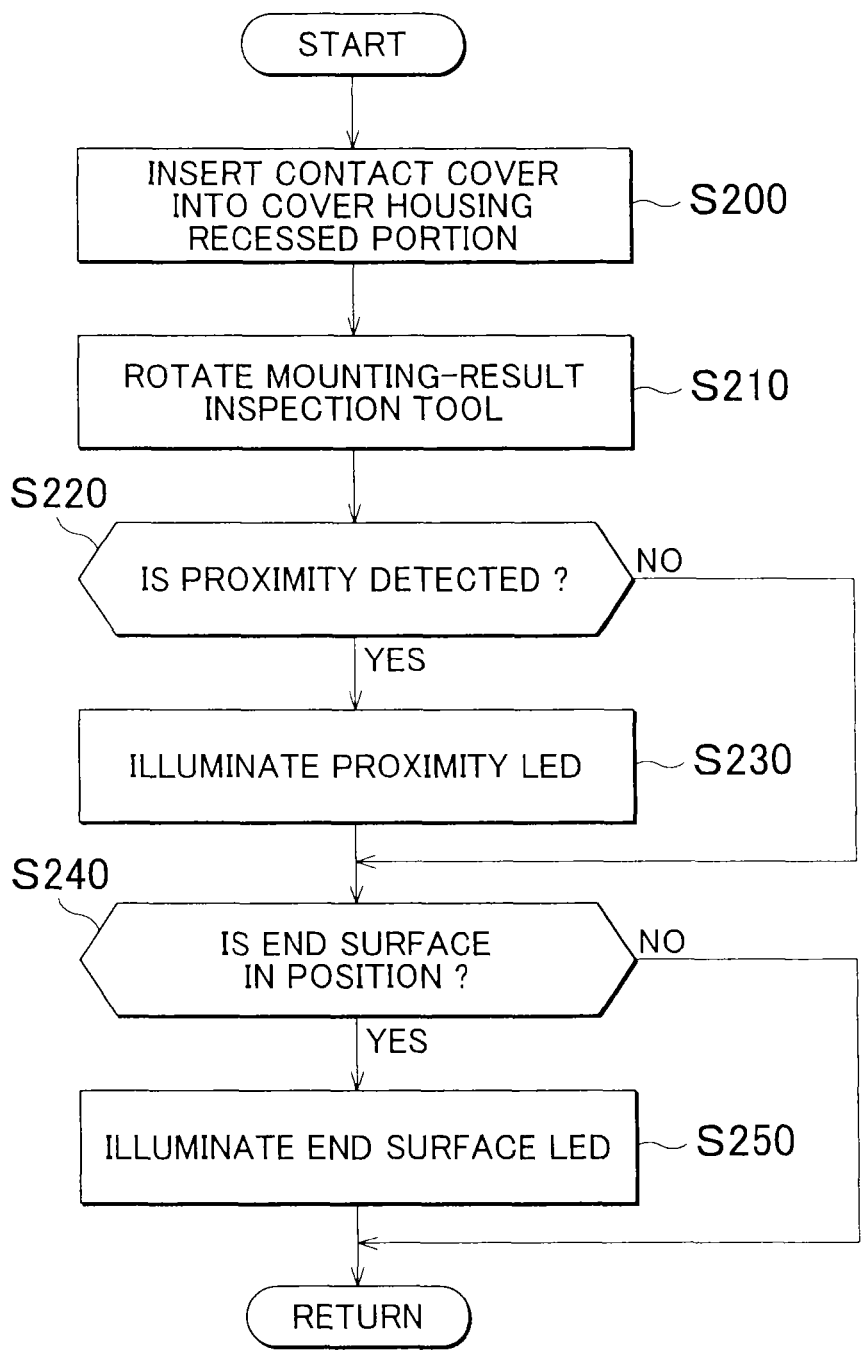
FIG. 25 is a flowchart illustrating the flow of a mounting-result inspection method according to the third example embodiment.

Next, a third example embodiment of the invention will be described with reference to FIGS. 24 and 25. The mounting-result inspection tool 21 of this example embodiment shown in FIG. 24 is similar to the mounting-result inspection tool 21 of the first example embodiment shown in FIG. 15, but minus the contact probe 26, the three earth probes 27, and the conduction LED 23a, and with the addition of an end surface LED 23c and a distance measuring sensor 42. The end surface LED 23c is provided on the nob 23. The distance measuring sensor 42 is provided on the inspection tool main body 22. The distance measuring sensor 42 is a sensor that measures the distance between the inspection tool main body 22 and the oil pan 2. A laser displacement meter is one example of the distance measuring sensor 42. The microcomputer 30 illuminates the end surface LED 23c when the distance between the inspection tool main body 22 and the oil pan 2 is equal to or less than a predetermined value as measured by the distance measuring sensor 42. The predetermined value is determined based on a measurement result when the clip 3 is properly attached to the clip attaching groove 19.

Next, a mounting-result inspection method for inspecting whether the clip 3 is properly attached to the clip attaching groove 19 using the mounting-result inspection tool 21 will be described with reference to FIG. 25. Steps S200 and S210 correspond to steps S100 and S110, respectively, in FIG. 17, so descriptions thereof will be omitted.

As shown in FIG. 24, when the clip 3 is properly attached to the clip attaching groove 19, the clip 3 is housed in the clip housing recessed portion 28 of the inspection tool main body 22. Also, because the clip 3 is housed in the clip housing recessed portion 28 of the inspection tool main body 22, the proximity sensor 25 detects that the clip 3 is housed in the clip housing recessed portion 28 of the inspection tool main body 22 (i.e., YES in S220), so the microcomputer 30 illuminates the proximity LED 23b (S230). Also, because the distance between the inspection tool main body 22 and the oil pan 2 is equal to or less than the predetermined value as measured by the distance measuring sensor 42 (i.e., YES in S240), the microcomputer 30 illuminates the end surface LED 23c (S250). A worker is able to confirm that the clip 3 is properly attached to the clip attaching groove 19 by confirming that both the proximity LED 23b and the end surface LED 23c are illuminated.

In contrast to this, when the clip 3 is not properly attached to the clip attaching groove 19, but is instead improperly attached thereto, the distance between the inspection tool main body 22 and the oil pan 2 as measured by the distance measuring sensor 42 will not be equal to or less than the predetermined value (i.e., NO in S240), so the microcomputer 30 does not illuminate the end surface LED 23c. A worker is able to confirm that the clip 3 is improperly attached to the clip attaching groove 19 by confirming that the end surface LED 23c is not illuminated.

Also, if the clip 3 was never attached to the connector 4 in the first place, the distance between the inspection tool main body 22 and the oil pan 2 will be equal to or less than the predetermined value as measured by the distance measuring sensor 42 (i.e., YES in S240), so the microcomputer 30 illuminates the end surface LED 23c (S250). However, because the clip 3 is not housed in the clip housing recessed portion 28 of the inspection tool main body 22, the proximity sensor 25 is unable to detect that the clip 3 is housed in the clip housing recessed portion 28 of the inspection tool main body 22 (i.e., NO in S220), so the microcomputer 30 will not illuminate the proximity LED 23b. A worker is able to confirm that the clip 3 was never attached to the connector 4 in the first place by confirming that the proximity LED 23b is not illuminated.

Fourth Example Embodiment

Figure 26:
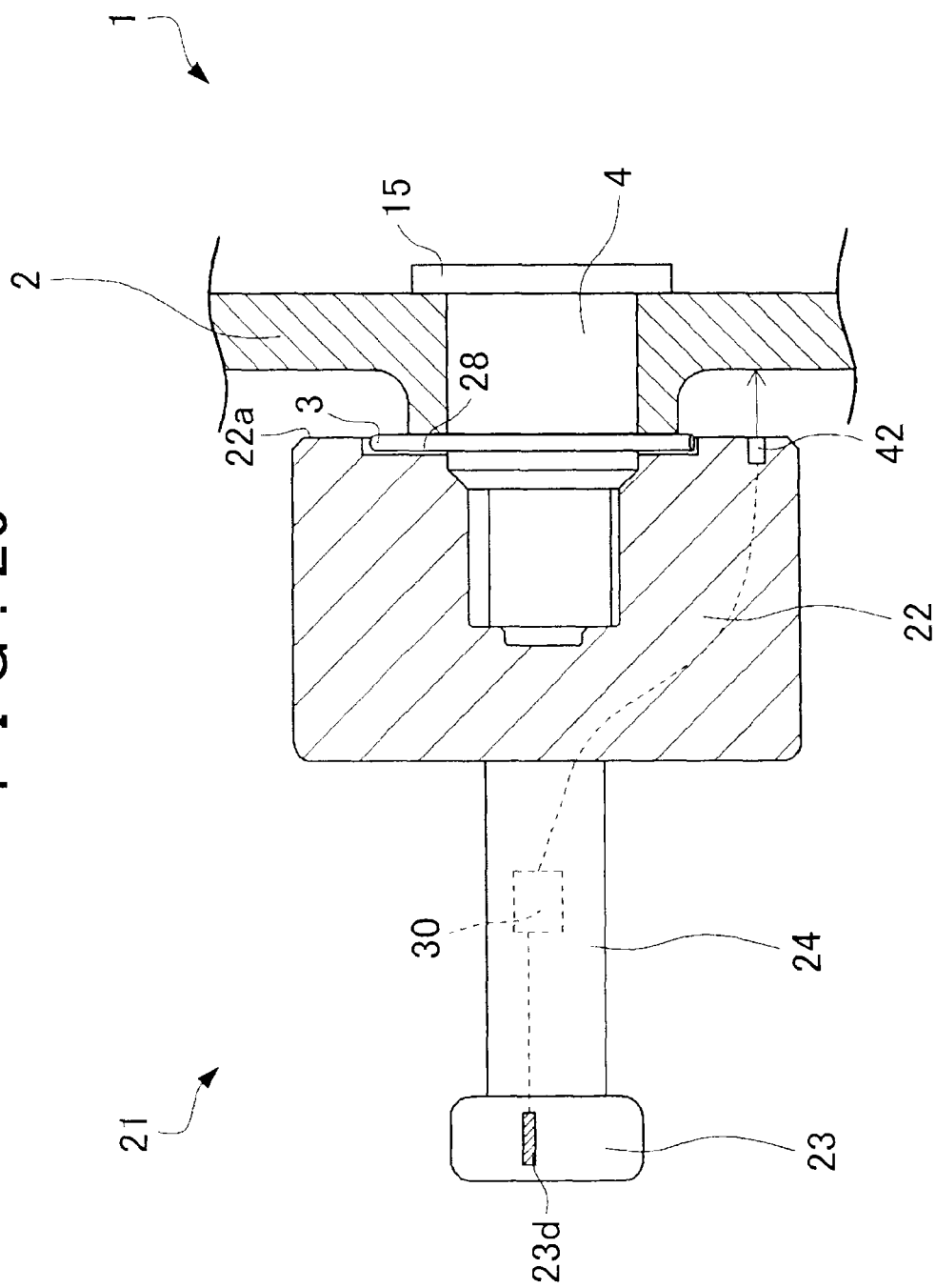
FIG. 26 is a side sectional view of a mounting-result inspection tool fitted to a contact cover of a connector according to a fourth example embodiment of the invention.
Figure 27:
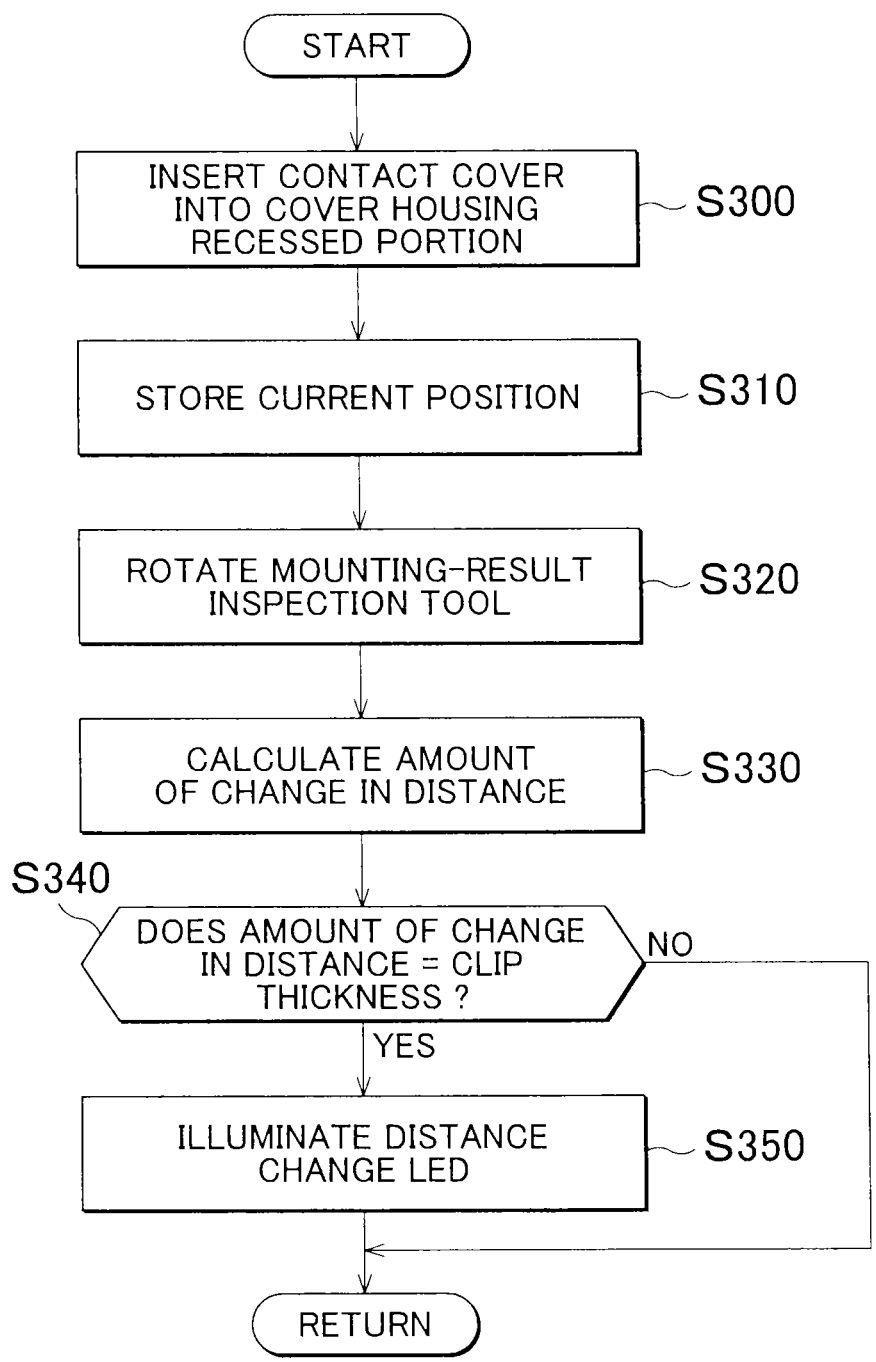
FIG. 27 is a flowchart illustrating the flow of a mounting-result inspection method according to the fourth example embodiment.

Next, a fourth example embodiment of the invention will be described with reference to FIGS. 26 and 27. The mounting-result inspection tool 21 of this example embodiment shown in FIG. 26 is similar to the mounting-result inspection tool 21 of the third example embodiment shown in FIG. 24, but minus the proximity sensor 25, the proximity LED 23b, and the end surface LED 23c, and with the addition of a distance change LED 23d. The distance change LED 23d is provided on the nob 23. The microcomputer 30 illuminates the distance change LED 23d when a change in distance between the inspection tool main body 22 and the oil pan 2, from after the tip end surface 22a of the inspection tool main body 22 abuts against the clip 3 until the clip 3 is housed in the clip housing recessed portion 28 of the inspection tool main body 22, is within a predetermined range.

Next, a mounting-result inspection method for inspecting whether the clip 3 is properly attached to the clip attaching groove 19 using the mounting-result inspection tool 21 will be described with reference to FIG. 27. Step S300 corresponds to step S200 in FIG. 25, so a description thereof will be omitted.

As shown in FIG. 26, when the clip 3 is properly attached to the clip attaching groove 19, the clip 3 temporarily abuts against the tip end surface 22a of the inspection tool main body 22. The microcomputer 30 measures the distance between the inspection tool main body 22 and the clip 3 at this time, and stores the result (S310). Next, the microcomputer 30 rotates the mounting-result inspection tool 21 (S320), and houses the clip 3 in the clip housing recessed portion 28 of the inspection tool main body 22. As a result, the distance between the inspection tool main body 22 and the oil pan 2 becomes smaller. The microcomputer 30 then calculates the amount of change in the distance at this time (S330). Also, when the amount of change in the distance is within a predetermined range, or more specifically, when the amount of change in the distance is substantially equivalent to the thickness of the clip 3 (i.e., YES in S340), the microcomputer 30 illuminates the distance change LED 23d (S350). A worker is able to confirm that the clip 3 is properly attached to the clip attaching groove 19 by confirming that the distance change LED 23d is illuminated.

In contrast to this, when the clip 3 is not properly attached to the clip attaching groove 19, but is instead improperly attached thereto, the amount of change in the distance will not be substantially equivalent to the thickness of the clip 3 (i.e., NO in S340), so the microcomputer 30 will not illuminate the distance change LED 23d. A worker is able to confirm that the clip 3 is improperly attached to the clip attaching groove 19 or that the clip 3 was never attached to the connector 4 in the first place, by confirming that the distance change LED 23d is not illuminated.

Also, if the clip 3 was never attached to the connector 4 in the first place, the amount of change in the distance will be zero (i.e., NO in S340), so the microcomputer 30 will not illuminate the distance change LED 23d. A worker is able to confirm that the clip 3 is improperly attached to the clip attaching groove 19 or that the clip 3 was never attached to the connector 4 in the first place, by confirming that the distance change LED 23d is not illuminated.

In this example embodiment as well, illumination of the distance change LED 23d may be allowed only when the distance between the inspection tool main body 22 and the oil pan 2 is equal to or less than a predetermined value as measured by the distance measuring sensor 42, just as in the third example embodiment.

What is claimed is:

1. A mounting-result inspection method for inspecting whether an elastic body of a connector mounting structure is properly attached to an elastic body attaching groove using a mounting-result inspection tool, the mounting-result inspection tool including an inspection tool main body and a probe;

the connector mounting structure including an oil pan having a connector mounting hole, the elastic body that extends in a U-shape, and a connector, the connector bringing wiring, from a level detection sensor that is arranged in the oil pan and detects a level of oil in the oil pan, out of the oil pan, the connector including a contact that is electrically connected to the level detection sensor, and a housing that retains the contact, the housing including a housing portion that is housed in the connector mounting hole, and the elastic body attaching groove and a catching portion that are arranged sandwiching the housing portion, the elastic body and the catching portion sandwiching the oil pan, such that the connector is attached to the oil pan, by the housing portion being housed in the connector mounting hole, and the elastic body being attached to the elastic body attaching groove;

the inspection tool main body having a recessed portion with a shape complementary to that of the elastic body that is properly attached to the elastic body attaching groove; and the probe contacting one of the contact of the connector, or the oil pan, when the elastic body that is properly attached to the elastic body attaching groove is housed in the recessed portion of the inspection tool main body, and not contacting the one of the contact of the connector, or the oil pan, when the elastic body is improperly attached to the elastic body attaching groove, the mounting-result inspection method comprising:

attempting to house the elastic body in the recessed portion of the inspection tool main body; and detecting that the probe is contacting the one of the contact of the connector, or the oil pan.

2. The mounting-result inspection method according to claim 1, further comprising:

detecting that the elastic body is housed in the recessed portion of the inspection tool main body.

3. The mounting-result inspection method according to claim 2, wherein the elastic body is made of metal that is magnetic material, and the oil pan is made of metal that is nonmagnetic material.

4. The mounting-result inspection method according to claim 1, wherein the mounting-result inspection tool is rotated such that an orientation of the recessed portion of the inspection tool main body matches an orientation of the elastic body, when attempting to house the elastic body in the recessed portion of the inspection tool main body.

* * * * *